(12) United States Patent
Russell et al.

(10) Patent No.: US 8,254,092 B2
(45) Date of Patent: Aug. 28, 2012

(54) MOUNT AND ELECTRONIC DISPLAY SYSTEM

(75) Inventors: Scott Russell, Woodbury, MN (US); Nick Stanek, Roseville, MN (US); Joel Pfister, Shorewood, MN (US); Dominic Grey, Blaine, MN (US); Jim Wohlford, Edina, MN (US)

(73) Assignee: Milestone AV Technologies LLC, Eden Prairie, MN (US)

( * ) Notice: Subject to any disclaimer, the term of this patent is extended or adjusted under 35 U.S.C. 154(b) by 291 days.

(21) Appl. No.: 12/669,347

(22) PCT Filed: Jul. 17, 2008

(86) PCT No.: PCT/US2008/070317
§ 371 (c)(1),
(2), (4) Date: Apr. 26, 2010

(87) PCT Pub. No.: WO2009/012379
PCT Pub. Date: Jan. 22, 2009

(65) Prior Publication Data
US 2010/0208418 A1    Aug. 19, 2010

Related U.S. Application Data

(60) Provisional application No. 61/019,112, filed on Jan. 4, 2008, provisional application No. 60/950,244, filed on Jul. 17, 2007.

(51) Int. Cl.
*H05K 5/00* (2006.01)
(52) U.S. Cl. .............. 361/679.01; 248/274.1; 248/125.7
(58) Field of Classification Search ............. 361/679.01; 248/274.1, 125.7
See application file for complete search history.

(56) References Cited

U.S. PATENT DOCUMENTS

| | | | |
|---|---|---|---|
| 3,072,374 A | 1/1963 | Bodian | |
| 6,315,258 B1 | 11/2001 | Myler et al. | |
| 6,409,134 B1 | 6/2002 | Oddsen, Jr. | |
| 7,438,269 B2 * | 10/2008 | Pfister et al. | ............. 248/292.14 |

(Continued)

FOREIGN PATENT DOCUMENTS
EP    1742469 A2    1/2007
(Continued)

OTHER PUBLICATIONS

EP Communication/Supplementary Search Report Dated Jun. 29, 2011, Cited in EP Application No. EP09701032.6, 2 Pgs.

(Continued)

*Primary Examiner* — Anthony Haughton
(74) *Attorney, Agent, or Firm* — Patterson Thuente Christensen Pedersen, P.A.

(57) ABSTRACT

A mounting system for a flat panel display includes a wall interface assembly, a pair of arm assemblies, and a mounting assembly. The wall interface assembly can include a slide plate connected to arm assemblies which enable the arm assemblies and mount assembly to be horizontally shifted without the need to remove the mount from the wall and reattach it. The arm assemblies may be substantially hollow arms having removable covers for storing wires connected to display therein. The mounting assembly can also include a pair of brace arms each having two generally D-shaped members placed back-to-back and slidable relative to each other to enable the mount assembly to be expanded to mount various sized displays without extending beyond the width of the display.

21 Claims, 42 Drawing Sheets

U.S. PATENT DOCUMENTS

| | | | |
|---|---|---|---|
| 7,753,332 B2* | 7/2010 | O'Keene | 248/292.14 |
| 8,094,438 B2* | 1/2012 | Dittmer et al. | 361/679.01 |
| 2002/0033436 A1* | 3/2002 | Peng et al. | 248/284.1 |
| 2002/0179801 A1* | 12/2002 | Kim | 248/441.1 |
| 2005/0127253 A1 | 6/2005 | Kim | |
| 2011/0019344 A1 | 1/2011 | Russell et al. | |

FOREIGN PATENT DOCUMENTS

| | | |
|---|---|---|
| JP | 03130558 U | 3/2007 |
| KR | 2002-0092698 | 12/2002 |
| KR | 2002-0092699 | 12/2002 |
| KR | 10-2004-0083737 | 10/2004 |
| WO | WO 2006/014051 A1 | 2/2006 |
| WO | WO2009/089169 A1 | 7/2009 |

OTHER PUBLICATIONS

EP Communication/Supplementary Search Report Dated Jun. 29, 2011, Cited in EP Application No. EP08781976.9, 2 Pgs.

File History for U.S. Appl. No. 12/811,687, filed Sep. 24, 2010.

PCT International Search Report Dated Mar. 23, 2009, Cited in PCT/US2009/030132, PCT Published App. No. WO2009/089169 A1.

* cited by examiner

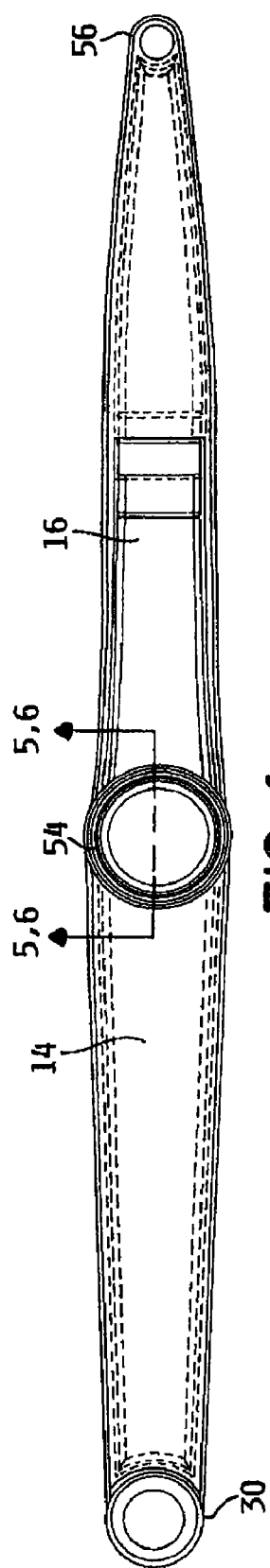
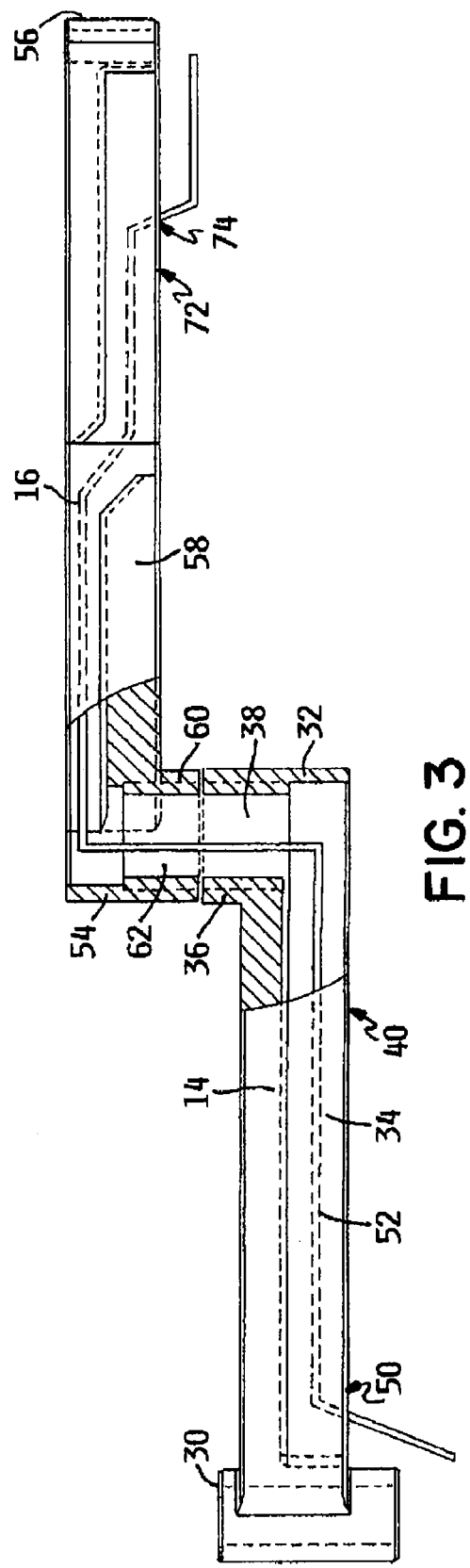

MOUNT AND ELECTRONIC DISPLAY SYSTEM

RELATED APPLICATIONS

This application claims the benefit of U.S. Provisional Patent Application Nos. 60/950,244, entitled ARTICULATED MOUNTING ARM WITH WIRE PATH THROUGH JOINT, filed Jul. 17, 2007, and 61/109,112, entitled FLAT PANEL DISPLAY MOUNT, filed Jan. 4, 2008, both applications being hereby fully incorporated by reference herein.

FIELD OF THE INVENTION

The invention relates to mounts for electronic display devices, and in particular to installation of mounts for electronic display devices.

BACKGROUND OF THE INVENTION

Electronic display devices such as LCD flat panel displays are in widespread use in commercial, industrial, institutional and home settings. There is often a need to mount these devices to a wall or ceiling in order to save counter, table or floor space. Numerous specialized mounts have been developed for the purpose of mounting electronic display devices from ceilings or walls. These mounts will often have arrangements of articulated arms in order to enable the display to be positioned in a desired position. Examples of such mounts are disclosed in U.S. Pat. No. 7,028,961, hereby fully incorporated herein by reference.

Cables and wires for supplying signal and power to a mounted display device present challenges. These wires and cables are unsightly and it is therefore desirable to conceal them in the mount or in other structures associated with the mount. If the wires are concealed in the mount, however, articulated joints in the mount present a problem in that free movement of the joint must be maintained. Also, pre-fabricated wires, especially video and signal cables, are generally terminated at both ends with molded plugs or connectors, which may be relatively large. While the arms of some existing mounts define wire channels or passages large enough to accommodate the passages of these connectors, the articulated joints generally are configured such that no passage at all is available through the joint, or the passage is so small as to not admit passage of the connector. For these reasons, wires and cables are generally routed externally around the articulated joints in existing mounts, or the wire is fished through the joints and the terminating connectors attached after the wire is in place. This results in unsightly wires and cables protruding from the mounting arms or in additional difficulty, expense and delay in mount installation.

Further, flat panel displays are typically mounted on a structure, such as a wall. Flat panel displays, especially LCD displays, are typically most clearly viewable from a position directly in front of the display. The display image is often too dark or not visible at all if viewed from a significant angle.

It is thus preferable that the angle of a flat panel display can be adjusted for optimum viewing. Various prior art positioning devices have been used, such as friction based hinges, mechanical linkages with springs or other biasing devices, and various mechanical latches. The friction based devices need to be sufficiently strong to hold a relatively heavy flat panel displays, while being easy to operate. Traditional friction based devices and mechanical latches often require one person to hold the flat panel display at the correct angle, while a second person adjusts the device. Movement in the upward direction requires the operator to lift a substantial portion of the weight of the flat panel display. In some instances, the operator must also overcome the resistance of the positioning device.

In order to properly support a flat panel display, a mounting device must also be firmly attached to the wall to which it is mounted. This requires fasteners that make holes in the wall. Thus, to make even a minor horizontal shift of the wall mount and display relative to the wall, an entire new set of holes must be made in the wall. Further, due to the weight of larger flat panel displays, fasteners holding the mount on a wall must typically extend into the wall studs. Since these studs are generally spaced apart at a standard distance such as 12, 16, or 24, inches, the location of a mount on a wall is limited.

The width of the portion of flat panel display mounting devices to which the flat panel display is mounted is sometimes adjustable. This is necessary due to the varying sizes of flat panel displays and, accordingly, the varying locations of mounting apertures for mounting the displays. When mounting brackets of a mounting device that is capable of mounting a wider display are brought closer together for mounting a narrower display, however, the brace arms upon which the mounting brackets slide can stick out beyond the width of the display and be unsightly.

What is needed is an articulated mounting arm for mounting an electronic display device wherein wires and cables can be concealed in the mounting arms and can extend through the articulated joints without exiting the mounting arms. What is further needed is a mount for electronic display devices that accommodates a wide variety of electronic displays and enables quick and aesthetically pleasing installation of the mount and display device.

SUMMARY OF THE INVENTION

The present invention addresses the need of the industry for an articulated mounting arm for mounting an electronic display device wherein wires and cables can be concealed in the mounting arms and can extend through the articulated joints without exiting the mounting arms, and the need for a mount for electronic display devices that accommodates a wide variety of electronic displays and enables quick and aesthetically pleasing installation of the mount and display device.

In an embodiment, a mounting system for a flat panel display includes a wall interface assembly, a pair of arm assemblies, and a mounting assembly. The wall interface assembly can include a slide plate connected to arm assemblies which enable the arm assemblies and mount assembly to be horizontally shifted without the need to remove the mount from the wall and reattach it. The arm assemblies may be substantially hollow arms having removable covers for storing wires connected to display therein. The mounting assembly can include a tilt head that provides a path of rotation about a substantially horizontal axis that extends proximate the center of gravity of the mount and a flat panel display mounted thereon, allowing for easy adjustment and rotation of display. The mounting assembly can also include a pair of brace arms each having two generally D-shaped members placed back-to-back and slidable relative to each other to enable the mount assembly to be expanded to mount various sized displays without extending beyond the width of the display.

Accordingly, in an embodiment, a mount for an electronic display device includes a wall interface portion adapted to attach to the wall of a structure, a display interface portion adapted to operably couple to the electronic display device, and at least one arm assembly with a pair of arms. Each arm presents a pair of opposing ends with the arms pivotally coupled together at a joint at one of the opposing ends of each arm. The opposite end of each arm is pivotally coupled to one of the wall interface portion or the display interface portion. Each arm defines a longitudinally oriented cavity for receiving wires therein, the arms together defining an aperture through the joint so as to connect the longitudinally oriented cavities of each arm such that the cavities and the aperture define a continuous wire passage extending substantially the length of the coupled arms for concealing wires therein from outside view.

The joint may include a pair of couplers, each coupler attached to a separate one of the at least one pair of arms. One of the couplers may have an outwardly extending radial flange with the other of the couplers having an inwardly extending radial flange, the flanges overlapping and interlocked with each other to pivotally couple the arms together.

In embodiments of the invention, at least one of the arms may define an opening on a top side of the arm extending from the exterior of the arm into the longitudinally oriented cavity of the arm. The mount further includes a removable cover for selectively closing the opening.

In other embodiments, the wall interface portion includes an arm mount pivotally coupled to the at least one arm assembly. The arm mount may be selectively laterally positionable on the wall interface portion.

The mount may further include a display interface portion with a tilt assembly enabling selective tilting of an electronic display coupled with the display interface portion about a substantially horizontal axis. Further, the mount may include a center bracket, a pair of side brackets laterally spaced apart from the center bracket, and a pair of vertically spaced apart brace arms coupling the center bracket and the pair of side brackets. Each of the brace arms includes a pair of members selectively slidably engaged with each other so as to enable the side brackets to be separately laterally positioned relative to the center bracket. The members of the brace arms may be elongate members having a generally D-shaped cross-section.

In further embodiments, an electronic display system includes an electronic display device, and a mount for attaching the electronic display device to the wall of a structure. The mount includes a wall interface portion adapted to attach to the wall, a display interface portion operably coupled to the electronic display device, and at least one pair of articulating arms operably coupling the wall interface portion and the display interface portion. The display interface portion includes a center bracket, a pair of side brackets laterally spaced apart from the center bracket, and a pair of vertically spaced apart brace arms coupling the center bracket and the pair of side brackets. Each of the brace arms includes a pair of members selectively slidably engaged with each other so as to enable the side brackets to be separately laterally positioned relative to the center bracket.

In further embodiments, the an electronic display system includes an electronic display device, a wall interface portion adapted to attach to the wall of a structure, a display interface portion operably coupled to the electronic display device, and at least one arm assembly comprising a pair of arms. Each arm presents a pair of opposing ends, the arms pivotally coupled together at a joint at one of the opposing ends of each arm. The opposite end of each arm is pivotally coupled to one of the wall interface portion or the display interface portion. Each arm defines a longitudinally oriented cavity for receiving wires therein. The arms together define an aperture through the joint so as to connect the longitudinally oriented cavities of each arm such that the cavities and the aperture define a continuous wire passage extending substantially the length of the coupled arms for concealing wires therein from outside view.

Objects and advantages of particular embodiments of the present invention may become apparent to those skilled in the art upon review of the figures and descriptions of the present invention herein.

BRIEF DESCRIPTION OF THE DRAWINGS

The invention may be more completely understood in consideration of the following detailed description of various embodiments of the invention in connection with the following drawings, in which:

FIG. 3 is a top plan view of an arm system according to an embodiment of the invention with the wire path depicted with hidden lines;

FIG. 4 is a side elevation view the arm system of FIG. 3 with the articulated joint depicted in partial cutaway;

Figure 1:
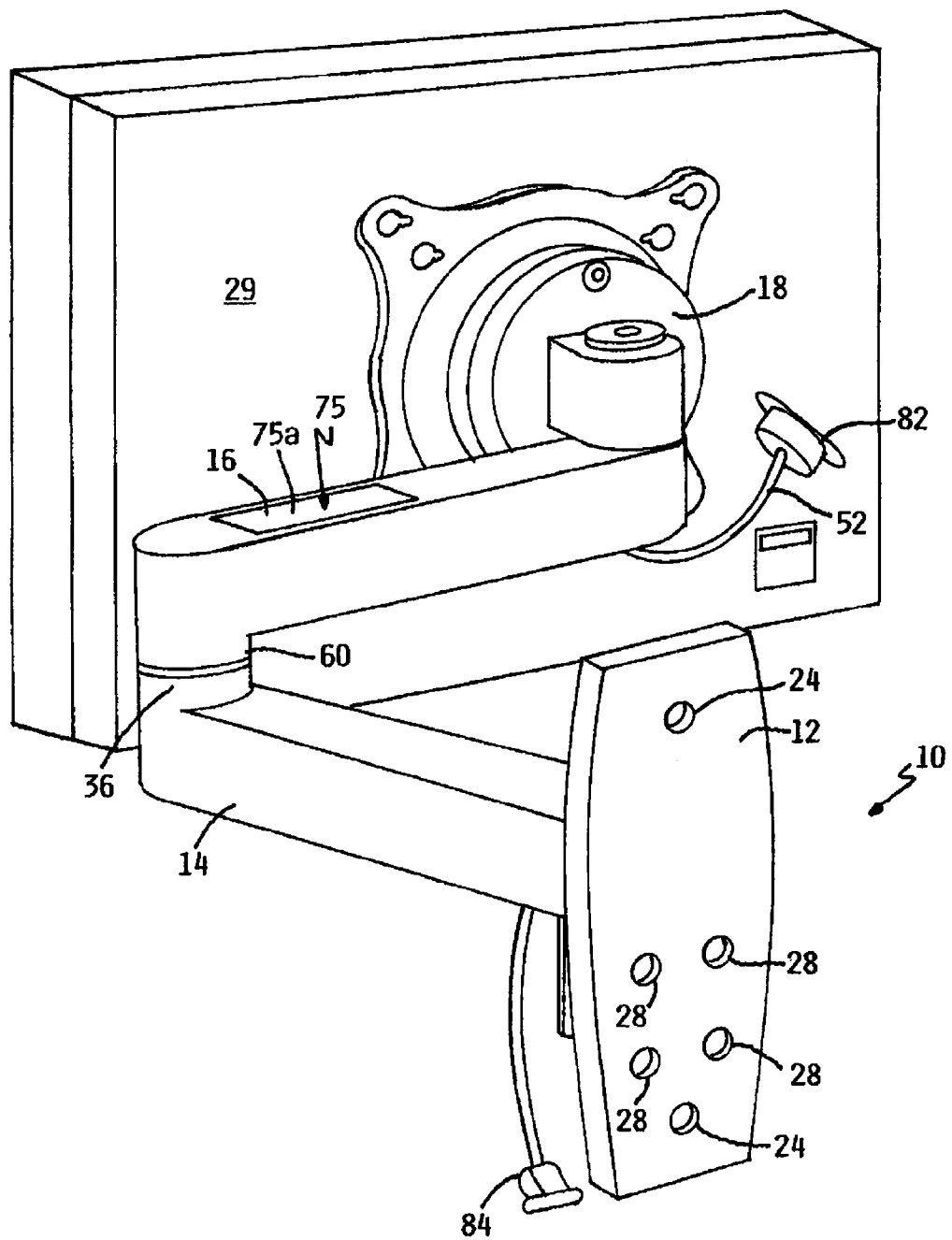
FIG. 1 is a rear perspective view of an articulated mounting arm system according to an embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives.

DETAILED DESCRIPTION OF THE PREFERRED EMBODIMENTS

In FIGS. 1-6 there are depicted embodiments of an articulated mounting arm system 10. Articulated mounting arm system 10 generally includes wall interface 12, inner mounting arm 14, outer mounting arm 16, and display interface 18. Wall interface 12 generally includes wall interface plate 20 and support bearing block 22. Wall interface plate 20 defines apertures 24 for receiving fasteners (not depicted) for attaching wall interface 12 to structure wall 26. Support bearing block 22 is attached to wall interface plate 20 with fasteners 28, and bears an upwardly projecting spindle (not depicted) upon which inner mounting arm 14 is horizontally pivotable. Further details of display interface 18 are disclosed in U.S. Patent Publication No. 2007/0153459, hereby fully incorporated herein by reference. Display interface 18 attaches to the back side of flat panel display device 29.

Figure 5:
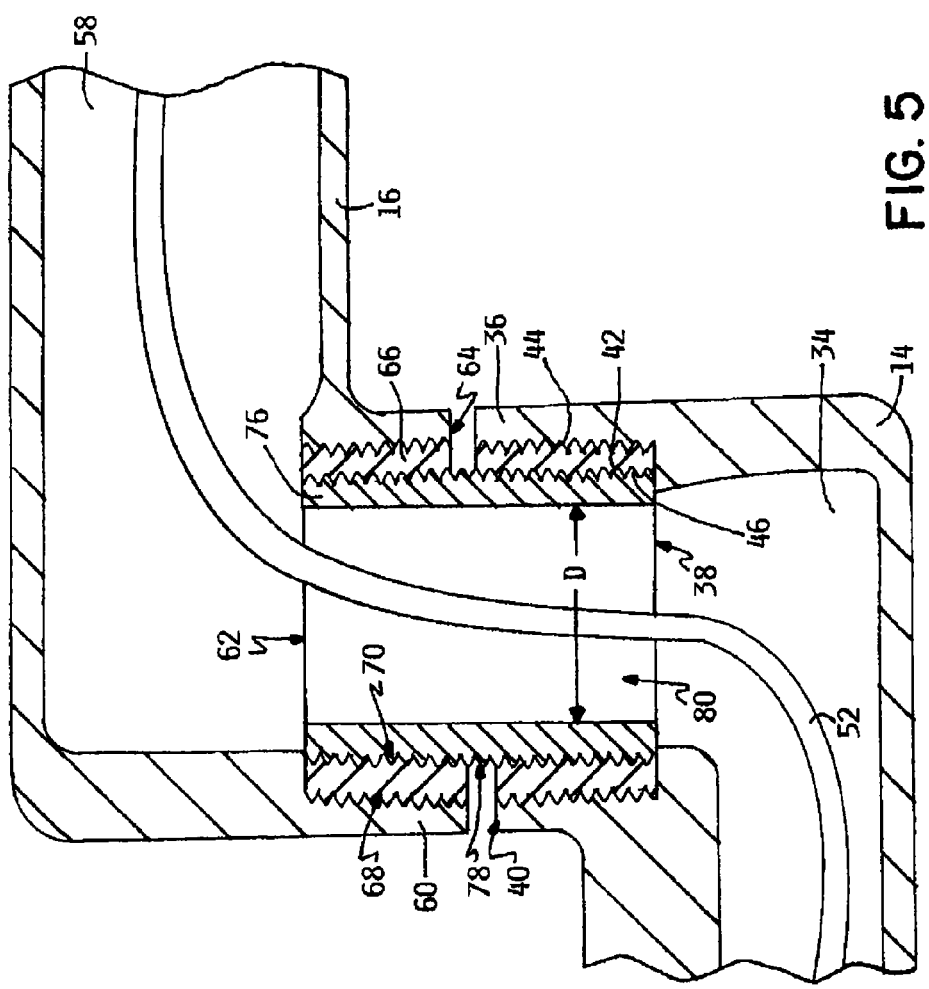
FIG. 5 is a fragmentary cross-section view of the articulated joint of the arm system of FIG. 3, taken at section 5-5 of FIG. 3.

Inner mounting arm 14 presents inner end 30 and outer end 32, and defines internal wire passage 34 extending longitudinally therethrough. Boss 36 projects upwardly at outer end 32 and defines vertical bore 38 extending downwardly from top surface 40 into wire passage 34. In the embodiment of FIG. 5, vertical bore 38 is threaded and receives insert 42 which is threaded on both outer surface 44 and inner surface 46. Lower surface 48 defines wire exit aperture 50 proximate inner end 30 to enable passage of wire 52 into and through wire passage 34. Inner end 30 is pivotally attached to support bearing block 22 as previously described.

Outer mounting arm 16 presents inner end 54 and outer end 56, and defines internal wire passage 58 extending longitudinally therethrough. Boss 60 projects downwardly at inner end 54 and defines vertical bore 62 extending upwardly from lower surface 64 into wire passage 58. In the embodiment of FIG. 5, vertical bore 38 is threaded and receives insert 66 which is threaded on both outer surface 44 and inner surface 70. Lower surface 72 defines wire exit aperture 74 proximate outer end 56 to enable passage of wire 52 into and through wire passage 58. Outer end 56 is horizontally pivotally attached to display interface 18. Access opening 75 with cover 75a may be defined in the upper surface of arm 16 to facilitate fishing of wire 52 through mount 10.

In the embodiment of FIG. 5, inner coupling sleeve 76 has threaded outer surface 78, and is threaded into inserts 42, 66, to pivotally join inner mounting arm 14 and outer mounting arm 16. Inner coupling sleeve 76 defines bore 80 extending therethrough and presenting diameter D. In embodiments of the invention, diameter D may preferably be in a range from about 1⅛ inch to about 2⅛ inch to accommodate the passage of wire connectors 82, 84. Because of the threaded coupling between insert 42 and sleeve 76 and insert 66 and sleeve 76, arms 14, 16, are selectively pivotable relative to each other.

In use, with mount 10 assembled, either connector 82, 84, is passed through wire exit 50, wire passage 34, bore 80, wire passage 58, and wire exit 74 to thread wire 52 through mount 10. With mount 10 coupling display 29 and wall 26, arms 14, 16, may be pivoted to position display 29 relative to wall 29. Sleeve 76 threads in and out of inserts 42, 66, to enable articulation between arms 14, 16.

Figure 6:
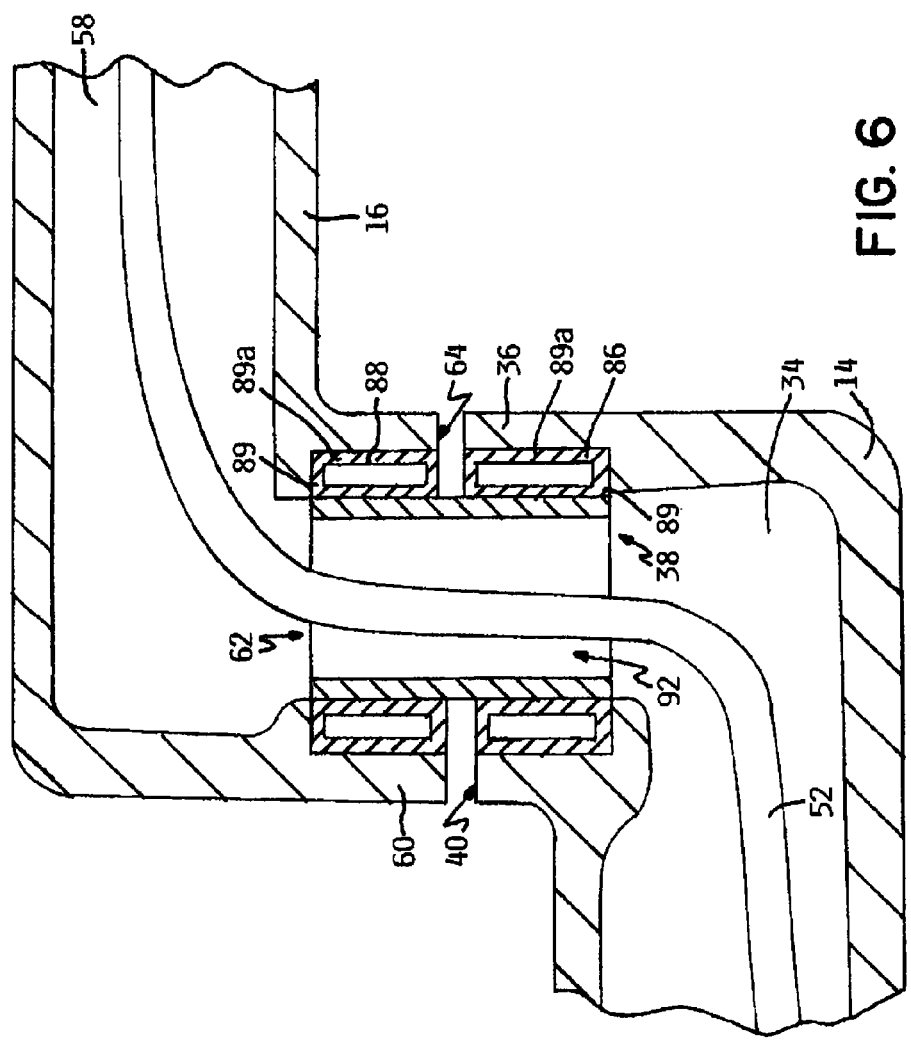
FIG. 6 is a fragmentary cross-section view of an alternative embodiment of the articulated joint of the arm system of FIG. 3, taken at section 6-6 of FIG. 3.

In the alternative embodiment of FIG. 6, bore 38 receives bearing 86, and bore 62 receives bearing 88. Bearings 86, 88, may be roller bearings as depicted, or may be any other type of suitable bearing enabling relative rotation of an inner race 89 within an outer race 89a. Coupling sleeve 90 defines bore 92 and extends through and is fixed to inner races 89 of bearings 88, 90. In use, with mount 10 assembled, either connector 82, 84, is passed through wire exit 50, wire passage 34, bore 92, wire passage 58, and wire exit 74 to thread wire 52 through mount 10. With mount 10 coupling display 29 and wall 26, arms 14, 16, may be pivoted to position display 29 relative to wall 29. Coupling sleeve 90 and inner races 89 rotate within outer races 89a to enable articulation between arms 14, 16.

Figure 2:
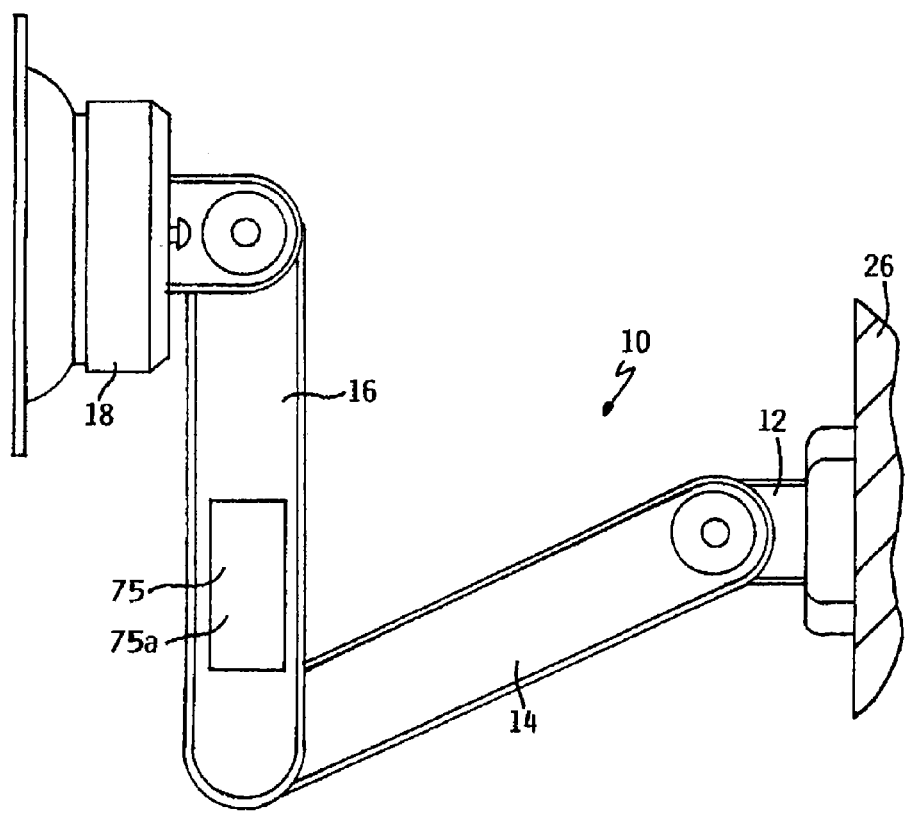
FIG. 2 is a top plan view of the arm system of FIG. 1.

FIGS. 1-26, 30-32 depict another embodiment of a display mount 100. Display mount 100 is adapted to mount an electronic display device such as a flat panel computer monitor or television. Referring to FIGS. 1-3, display mount 100 generally includes mounting assembly 102 and wall interface assembly 104 coupled with arm assemblies 106.

Wall interface assembly 104 generally includes rectangular support 105 having side rails 108, 110, top rail 112 and bottom rail 114. Side rails 108, 110, top rail 112, and bottom rail 114 define back surface 122 that can be mounted on a wall or other support surface.

Top rail 112 and bottom rail 114 define a plurality of elongated mounting slots 116. Mounting slots 116 are configured to enable wall interface assembly 104 to be mounted to a wall or other support surface with fasteners extending through the slots. The elongated nature of mounting slots 116 provides for flexibility in positioning display mount 100 horizontally side-to-side relative to the studs in a wall. This is advantageous because the weight of larger flat panel displays often dictates that the mounting device must be attached to studs in order to provide proper support. Round mounting apertures as provided in prior devices may not correspond to stud locations at the desired position of the mount on the wall. Elongated mounting slots 116 overcome this disadvantage.

Top rail 112 and bottom rail 114 may each define track 118 extending along an interior surface thereof. Slide plate 120 is slidably disposed within tracks 118. Slide plate 120 provides for flexibility in horizontal positioning of display relative to the mounting surface by enabling horizontal shifting of arm assemblies 106 and mounting assembly 102 without having to remove and reattach wall interface assembly 104. This enables a greater range of positioning options of the mount on a wall surface without creating more mounting holes in the support surface or requiring the mount 100 to be mounted between wall studs.

Arm assemblies 106 are pivotally coupled to slide plate 120 of wall interface assembly 104. In one embodiment, arm assemblies can be pivotally connected by inserting a sleeve 109 of each arm assembly over a connector rod 124 affixed to slide plate 120 with brackets 125. Each arm assembly 106 includes a first arm 126 pivotally connected to a second arm 128. Second arms 128 are pivotally connected to mount assembly 102 with arm mount 136.

Figure 30:
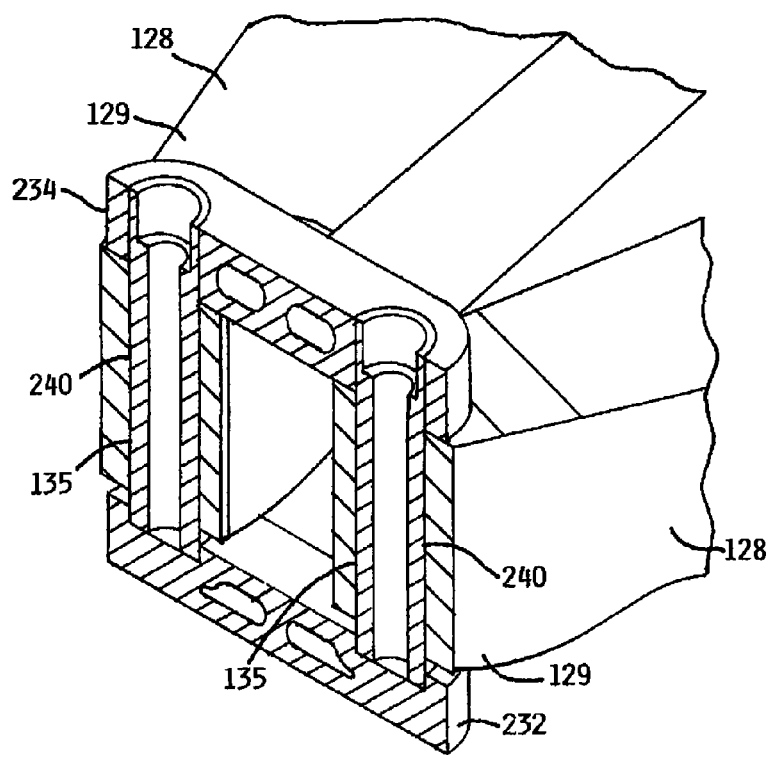
FIG. 30 is a cross-sectional view taken at section 30-30 of FIG. 23.
Figure 32:
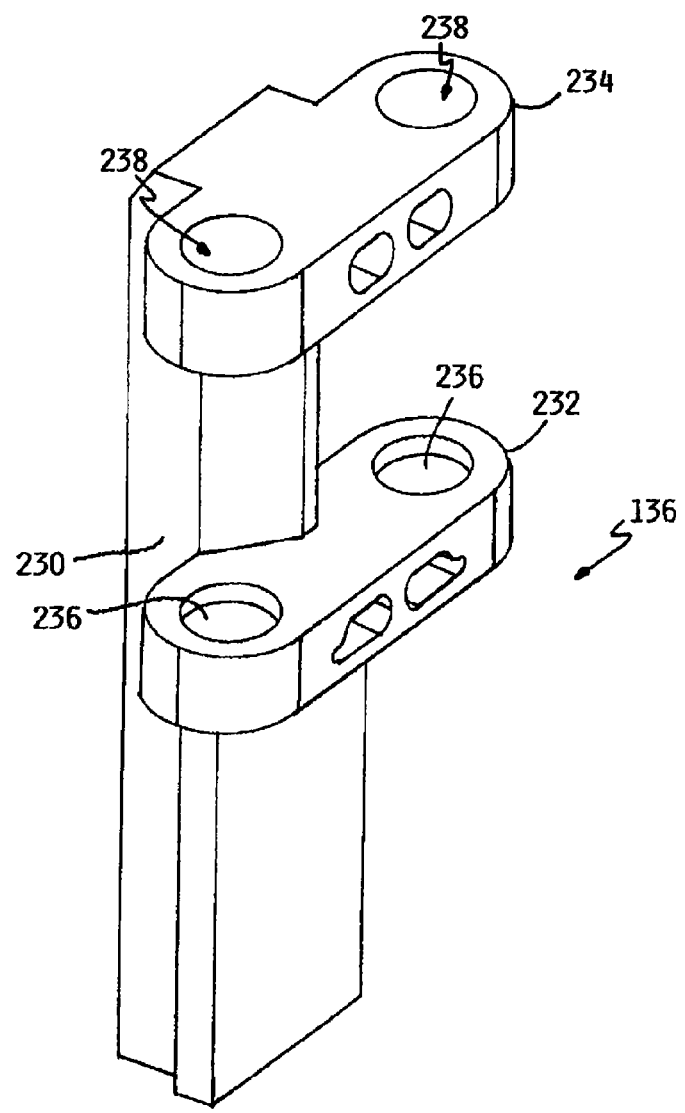
FIG. 32 is a perspective view of an arm mount portion of the mount of FIG. 4.

Arm mount 136 as depicted in FIG. 32 generally includes column 230, lower flange 232, and upper flange 234. Lower flange 232 defines recesses 236, while upper flange 234 defines apertures 238. As depicted in FIG. 30, arms 128 are pivotally coupled to arm mount 136. End portion 129 of arm 128 defines bore 240 therethrough. Pivot pins 135 are received through apertures 238 and bore 240 and rest in recesses 236. A safety feature of this configuration is that pivot pins 135 are retained in place by gravity and arm mount 136 cannot be disconnected from arms 128 unless pivot pins 135 are drawn upward through apertures 238.

As can be seen in FIGS. 10-13, arms 126, 128 are substantially hollow, with arm 126 defining wire channel 216 and arm 128 defining wire channel 218. This enables wires that are to be connected to a display on display mount 100 to be contained substantially within arms 126, 128. Arms 126, 128 may include a plurality of removable covers 130 that enable access to the wire channels 216, 218, in arms 126, 128 for inserting and removing wires. Wire apertures 129 are defined in a bottom surface 127 of arms 126, 128 through which wires can extend for connection with the display, wall outlet, or other device. When wires are disposed within arms 126, 128, the wires are substantially hidden from view, which creates a more aesthetically pleasing appearance. Such positioning also reduces the likelihood and extent to which wires may become tangled with each other.

Figure 31:
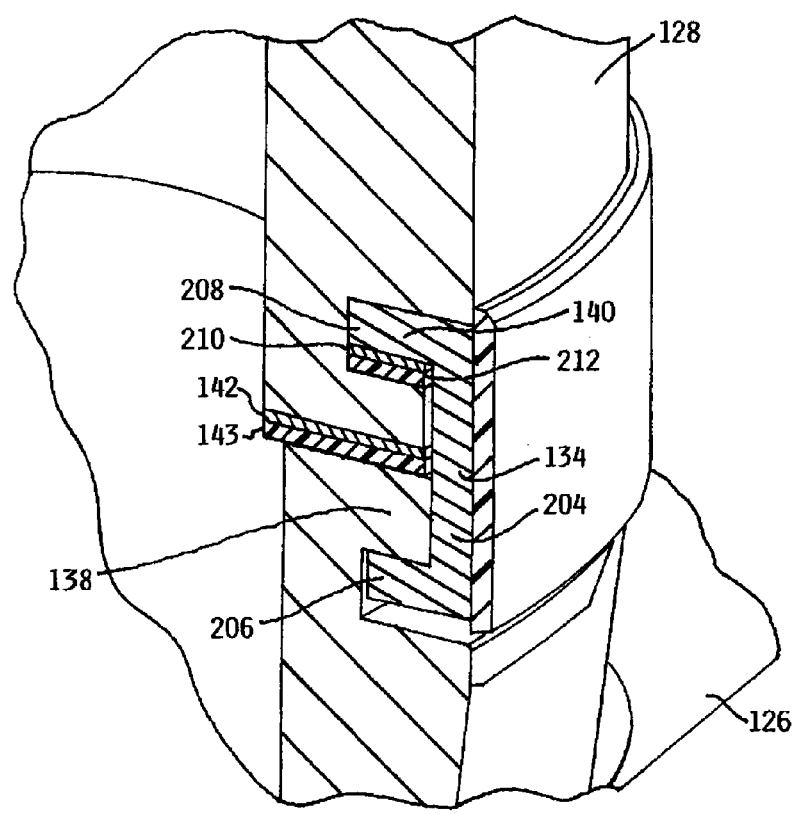
FIG. 31 is a cross-sectional view taken at section 31-31 of FIG. 14.

Referring to FIGS. 14-19 and 31, first arm 126 and second arm 128 are pivotally connected to one another. Flange portion 138 of first arm 126 abuts flange portion 140 of second arm 128 with metal friction washer 142 and polymer friction washer 143 disposed therebetween. The position of metal washer 142 and polymer washer 143 may be reversed in some embodiments. First arm 126 defines circumferential recess 200 while second arm 128 defines circumferential recess 202. C-clamps 134 retain flange portions 138, 140 together. Each c-clamp 134 generally includes web portion 204 with projecting upper 206 and lower 208 legs. Lower leg 208 is received in recess 200 while upper leg 206 is received in recess 202. Split ring washers 210, 212, are received in recess 202 below upper leg 206 as depicted in FIG. 31. Again split ring washers 210, 212, may be made from metal and polymer materials respectively, and may be reversed in position in some embodiments. Band 132 surrounds c-clamps 134 to retain them in position. The washers in each pair 142, 143, and 210, 212, may be advantageously made from diverse materials (e.g. metal and polymer) in that this has been found to enable smooth pivoting of arms 126, 128, without undue friction, sticking, and component wear.

Figure 15:
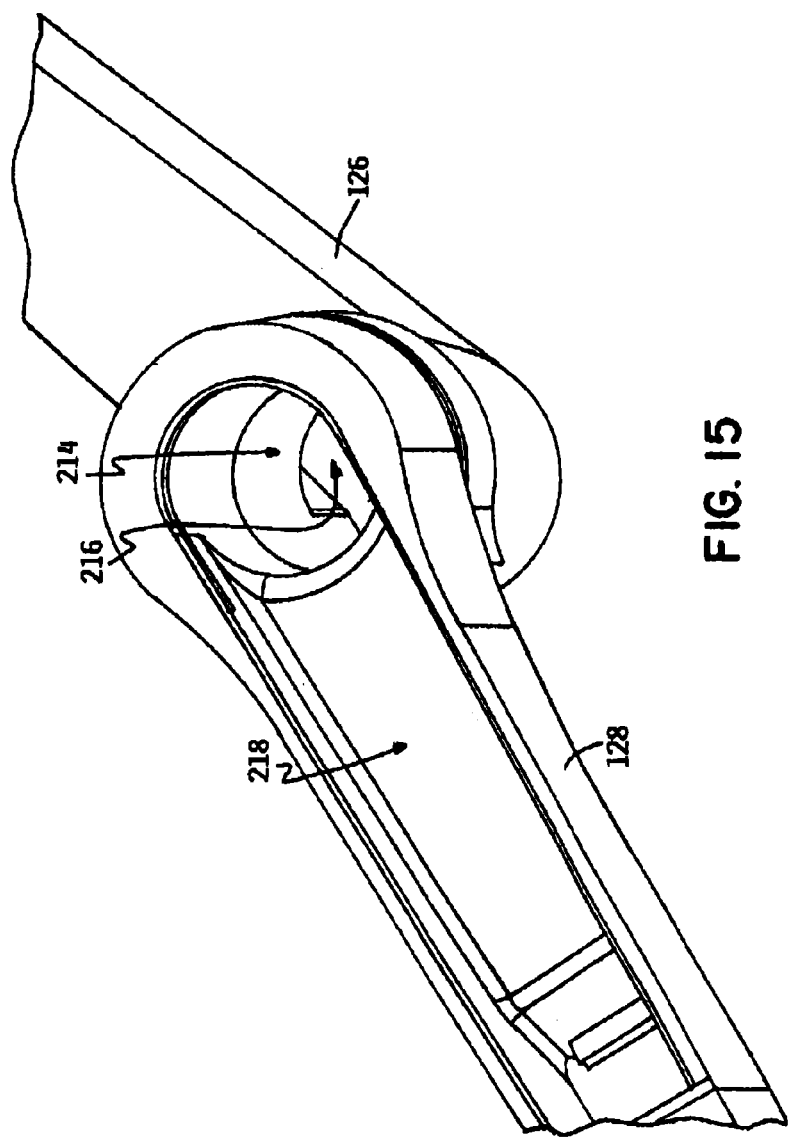
FIG. 15 is a top perspective view of the pivotal connection between the arms of the display mount of FIG. 7 with wire covers removed.
Figure 16:
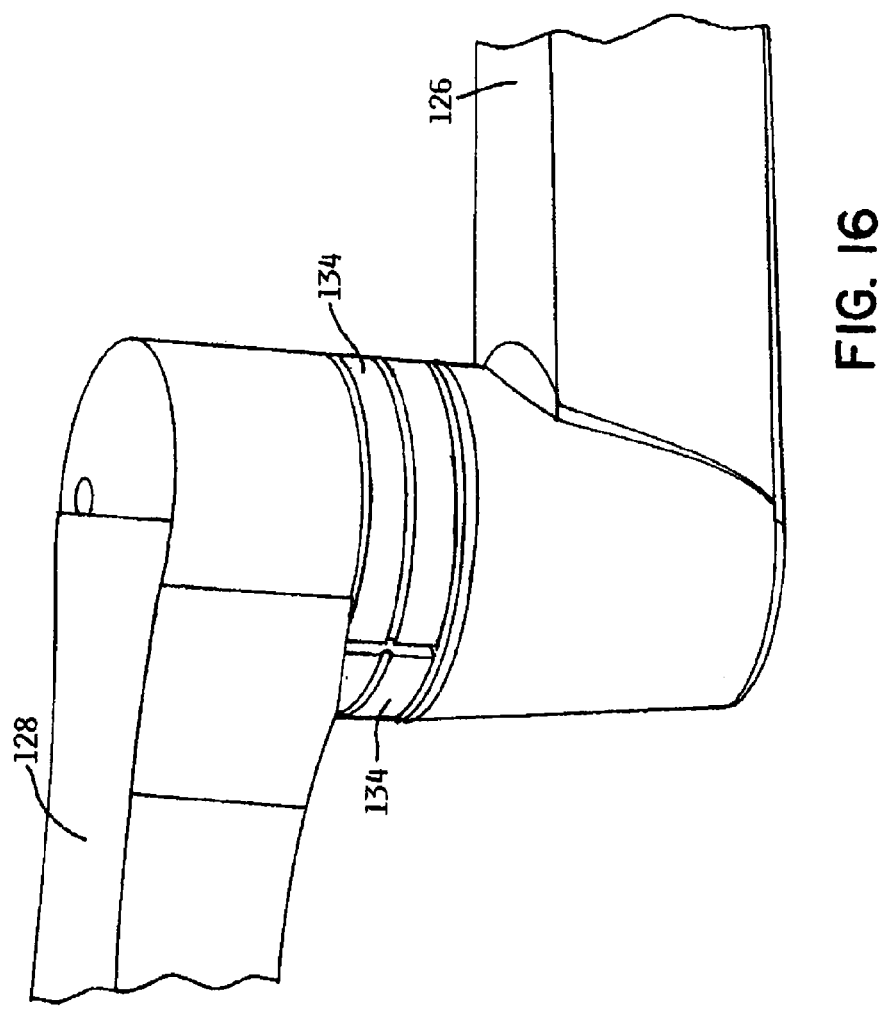
FIG. 16 is a fragmentary perspective view of the articulating arm joint portion of the flat panel display mount of FIG. 7 with an outer portion removed of the assembly removed.
Figure 17:
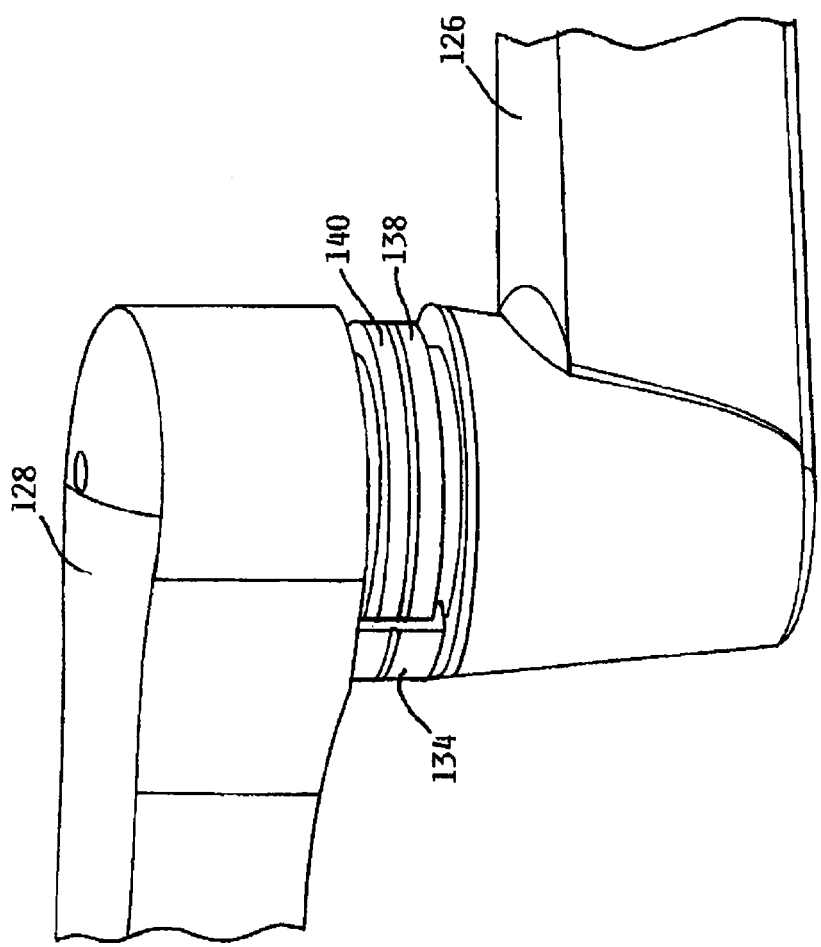
FIG. 17 is a perspective view of the portion of the flat panel display mount depicted in FIG. 16 with a further component removed.
Figure 18:
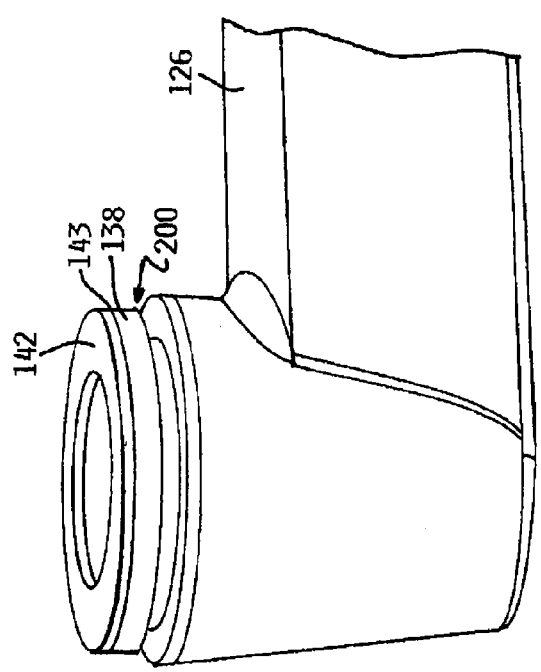
FIG. 18 is a fragmentary perspective view of the end of a lower arm of the flat panel display mount of FIG. 7.
Figure 19:
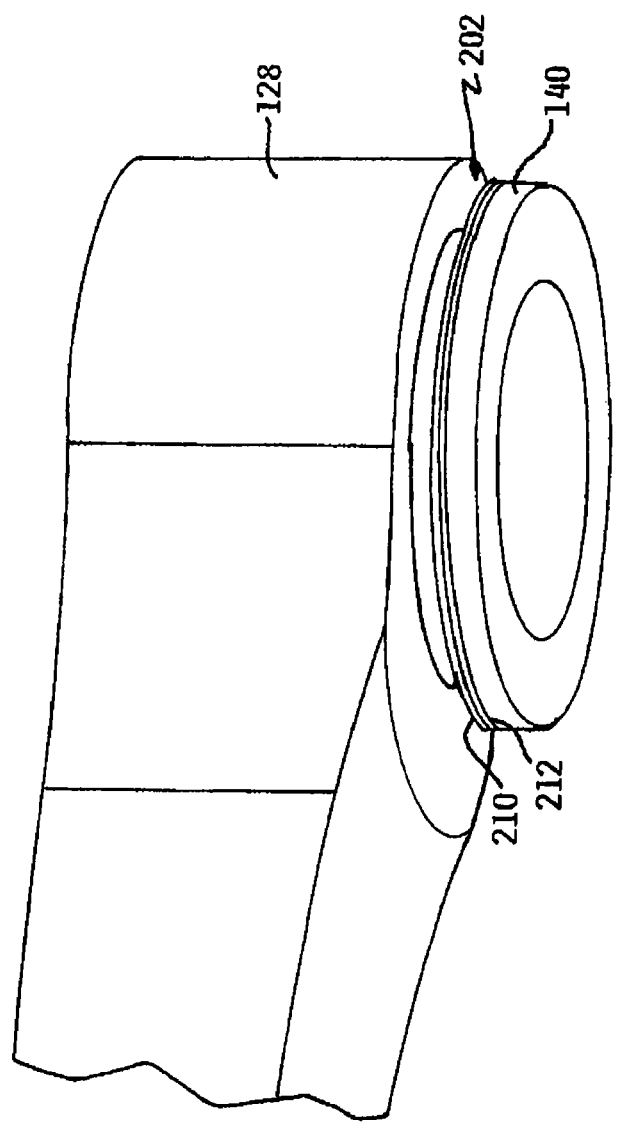
FIG. 19 is a fragmentary perspective view of the end of an upper arm of the mount of FIG. 7.

As depicted in FIG. 15, the pivoting connection between arms 126, 128, is advantageous in that the arms together define central bore 214 connecting wire channel 216 in arm 126 with wire channel 218 in arm 128. Central bore 214 is preferably sized to enable passage therethrough of the largest wire connector that will be connected to a display mounted on display mount 100.

Figure 33:
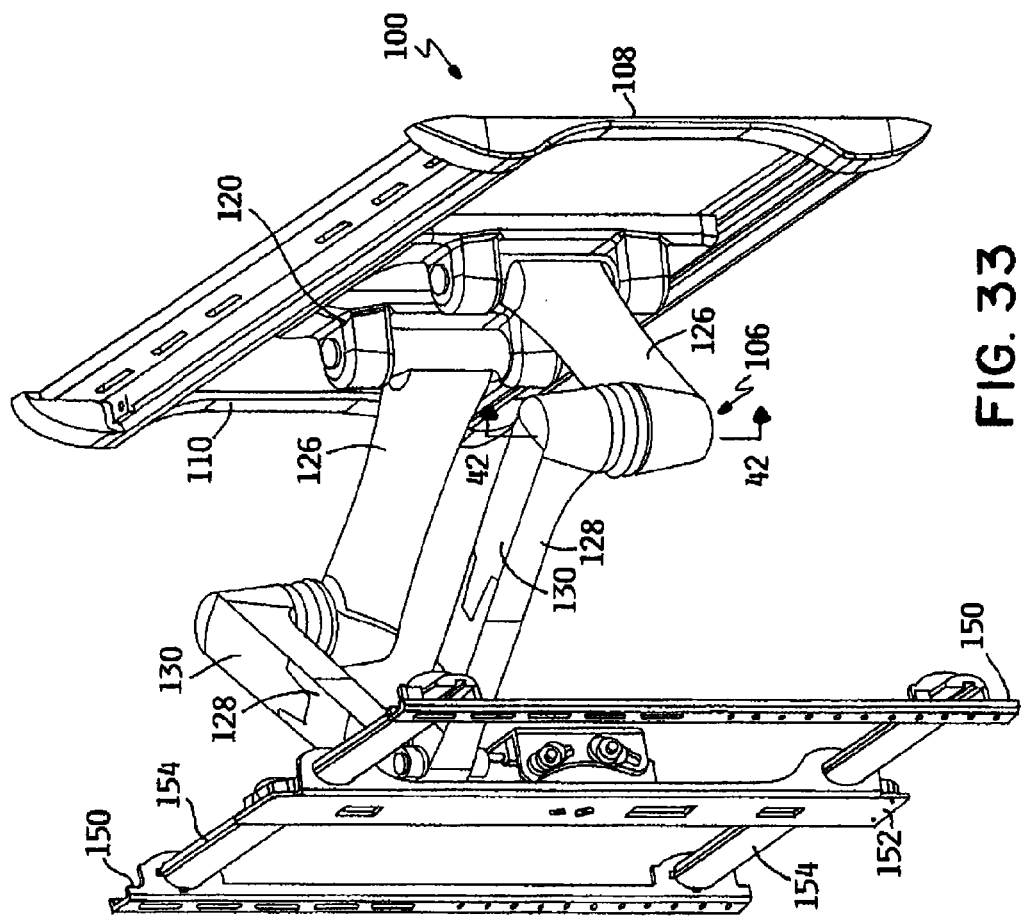
FIG. 33 is a perspective view of a flat panel display mount according to an alternative embodiment of the present invention.
Figure 34:
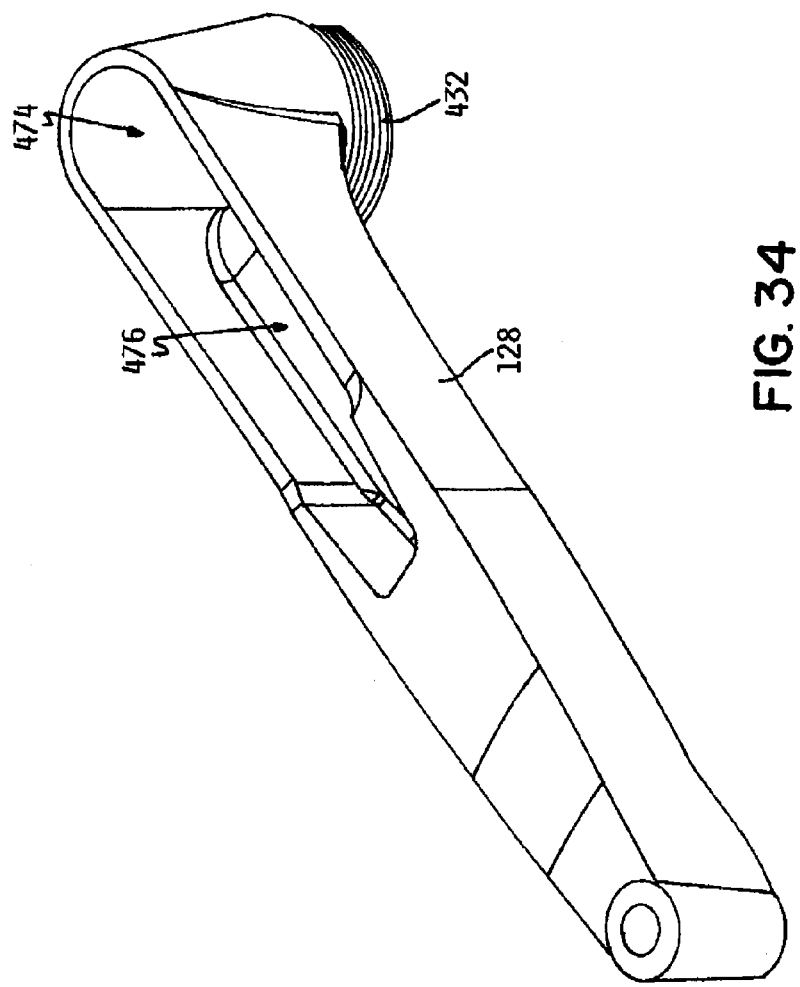
FIG. 34 is a top perspective view of an arm portion of the mount of FIG. 33.
Figure 35:
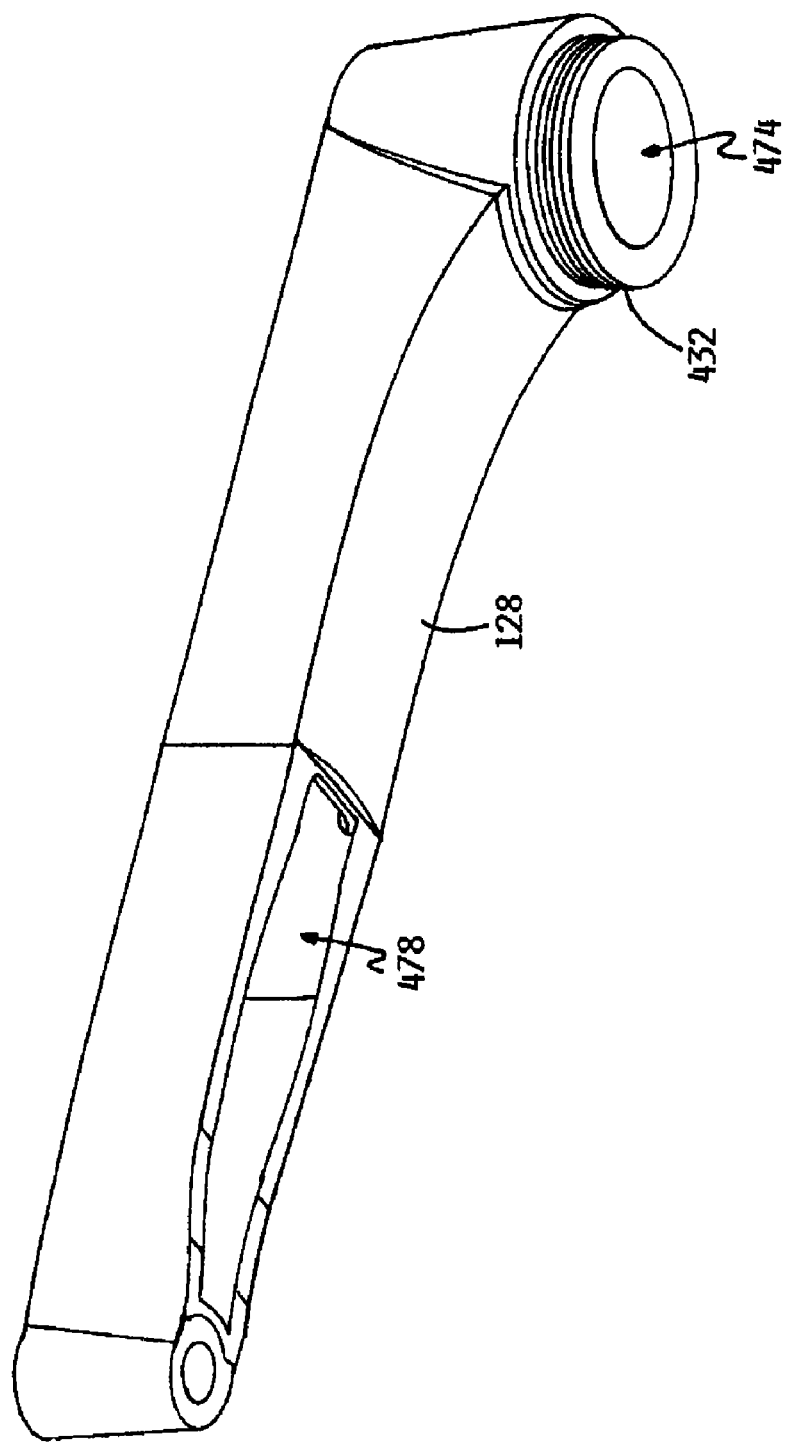
FIG. 35 is a bottom perspective view of the arm of FIG. 34.
Figure 36:
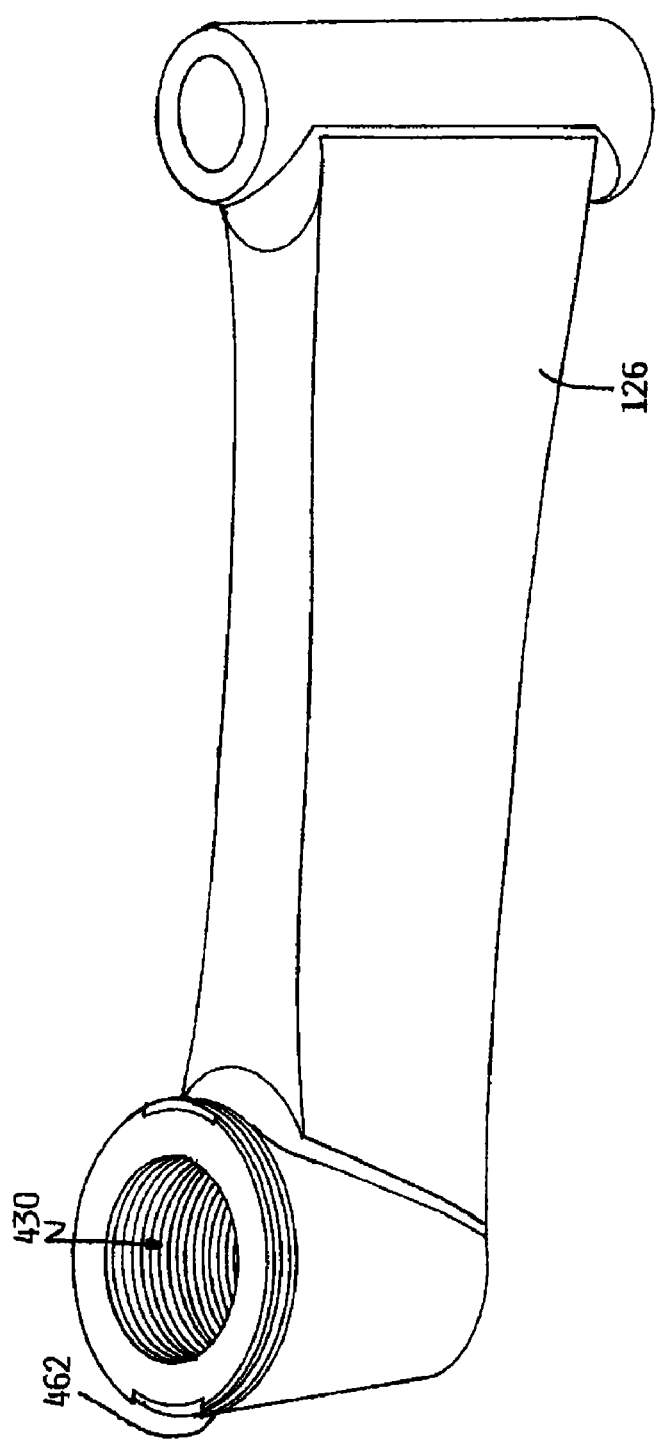
FIG. 36 is a top perspective view of another arm portion of the mount of FIG. 33.
Figure 37:
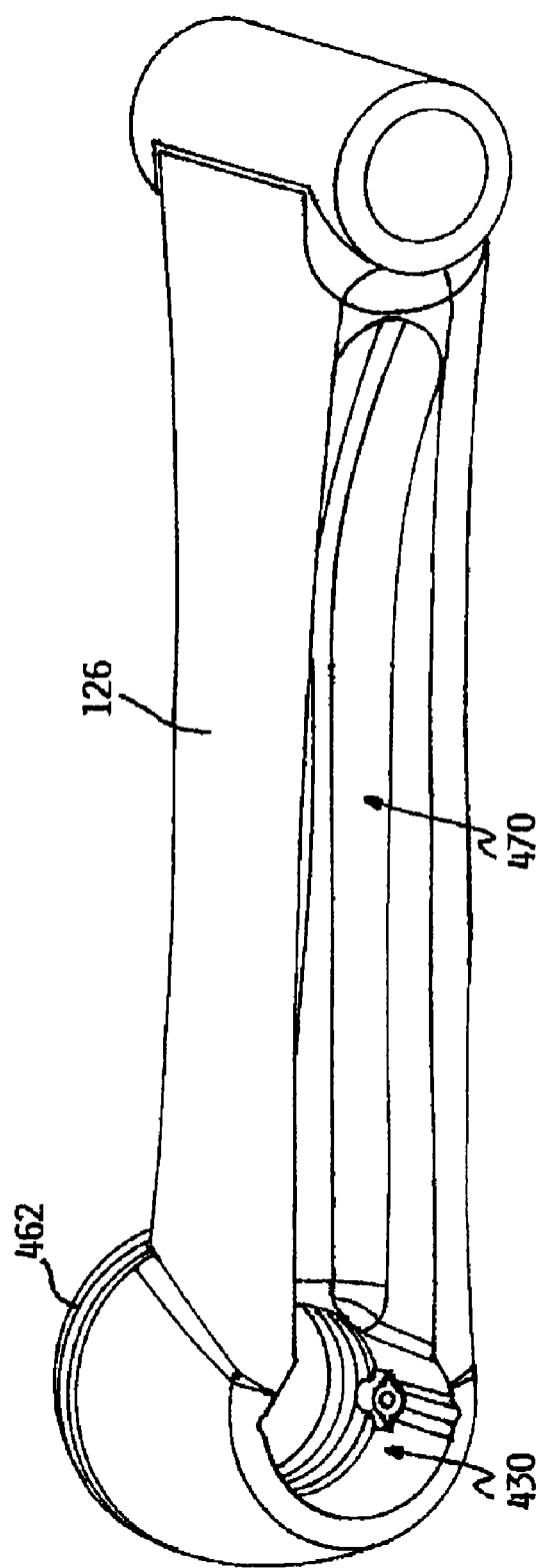
FIG. 37 is a bottom perspective view of the arm of FIG. 36.
Figure 38:
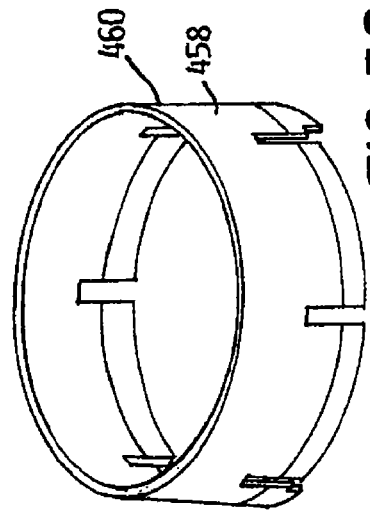
FIG. 38 is a perspective view of a collar portion of the mount of FIG. 33.
Figure 41:
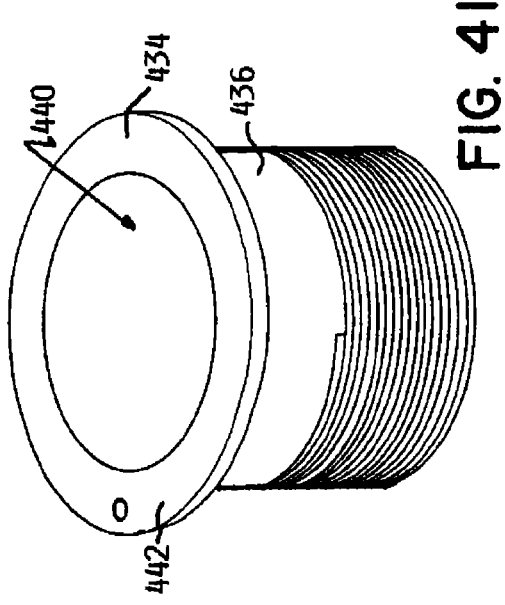
FIG. 41 is a perspective view of another coupler portion of the mount of FIG. 33.
Figure 39:
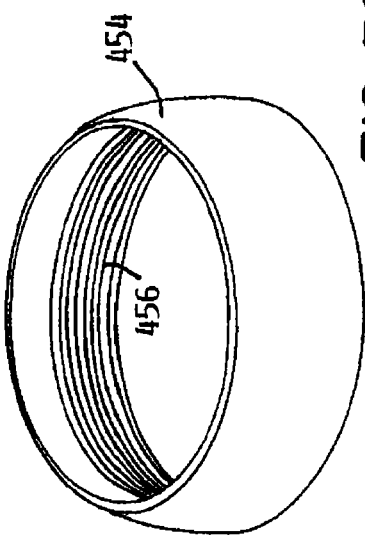
FIG. 39 is a perspective view of a sleeve portion of the mount of FIG. 33.
Figure 40:
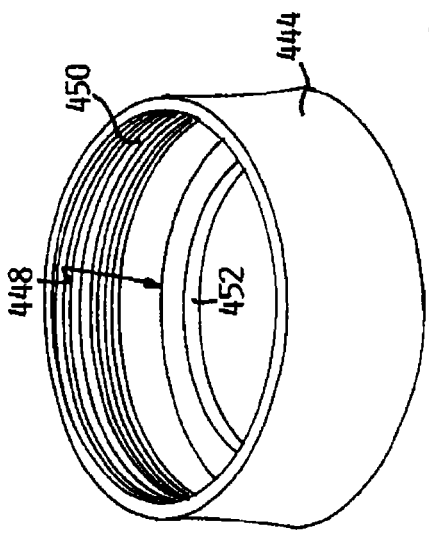
FIG. 40 is a perspective view of a coupler portion of the mount of FIG. 33.
Figure 42:
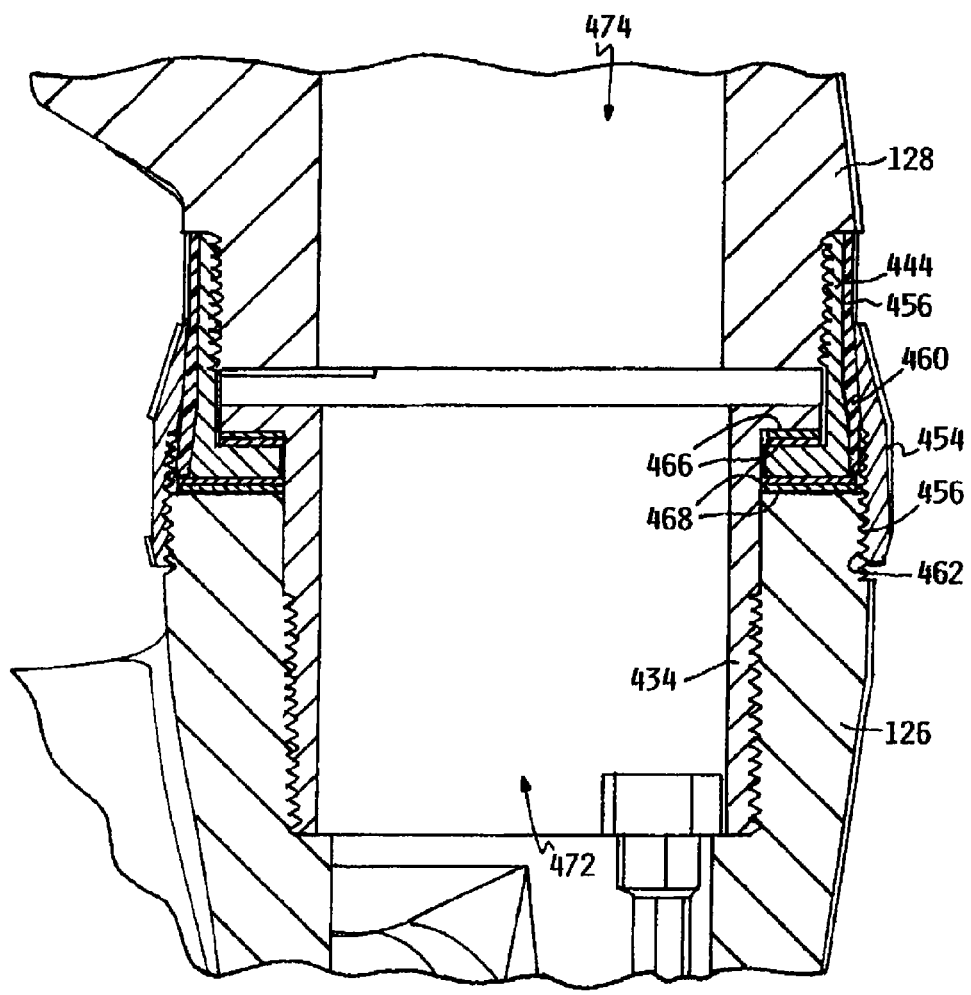
FIG. 42 is a cross-sectional view taken at section 42-42 of FIG. 33.
Figure 43:
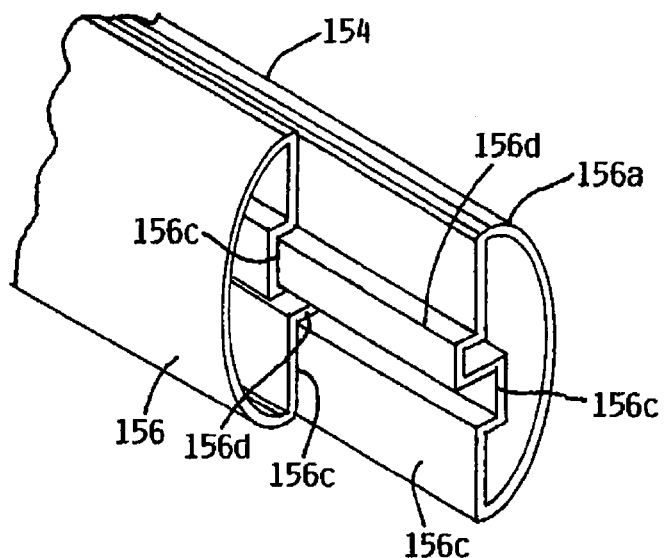
FIG. 43 is a fragmentary perspective view of a brace arm of the mount of FIG. 33.
Figure 44:
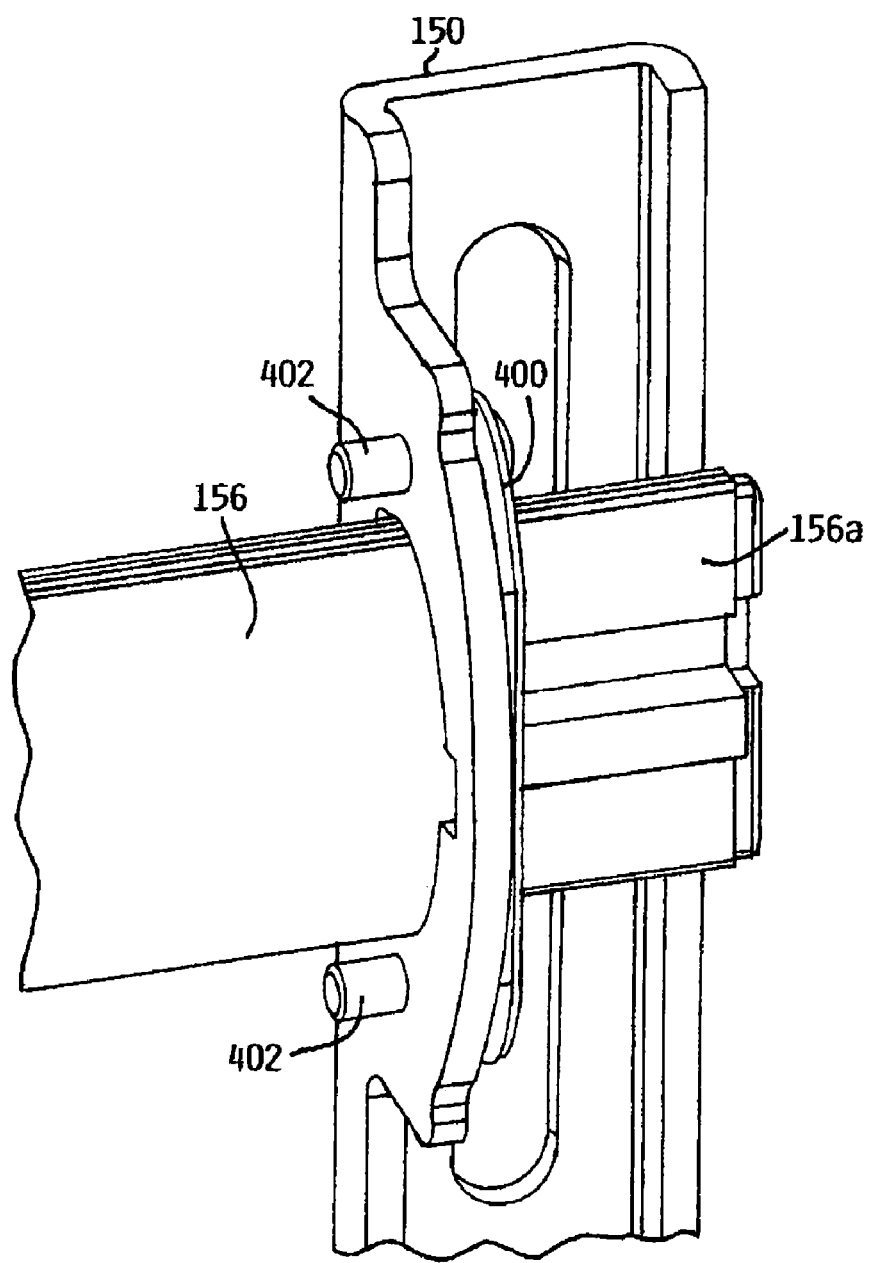
FIG. 44 is a fragmentary perspective view of a brace arm and side bracket of the mount of FIG. 33.

In an alternative embodiment depicted in FIGS. 33-42, arm 126 defines threaded bore 430 and arm 128 has exterior threaded portion 432. First coupler 434 has cylindrical body portion 436 presenting exterior threads 438 and defining central bore 440. Radial flange 442 extends laterally outward at one end. Second coupler 444 also has a cylindrical body portion 446 defining a central bore 448 with inwardly facing threading 450. Flange 452 extends into bore 448 at one end. Collar 454 has inwardly facing threading 456. As depicted in the cross-section of FIG. 42, first coupler 434 is threaded into threaded bore 430 while second coupler 444 threads over exterior threaded portion 432 of arm 128. Sleeve 458 fits over the outside of second coupler 444 and presents outwardly facing sloped surface 460. Collar 454 fits over sleeve 458 with threading 456 engaging outwardly facing threading 462 of arm 126. As collar 454 is threaded onto arm 126, inwardly facing sloped surface 464 of collar 454 bears on outwardly facing sloped surface 460 of sleeve 458 to apply a desired amount of friction to resist pivoting movement of arm 128 relative to arm 126. Friction washers 466, 468, may be provided between flanges 442, 452, and between flange 452 and arm 126 as depicted in FIG. 42. As with other embodiments, wires or cables can be passed from an outlet on a wall through downwardly facing wire cavity 470 of arm 126, up through wire passage 472 defined by bore 440 and bore 474 defined in arm 128 and into wire channel 476 of arm 128. From here, the wires or cables can out routed out through bottom opening 478 and connected to a display attached to the mount. A cover 130 can be provided to conceal the top opening to wire channel 476 as depicted in FIG. 33.

Figure 7:
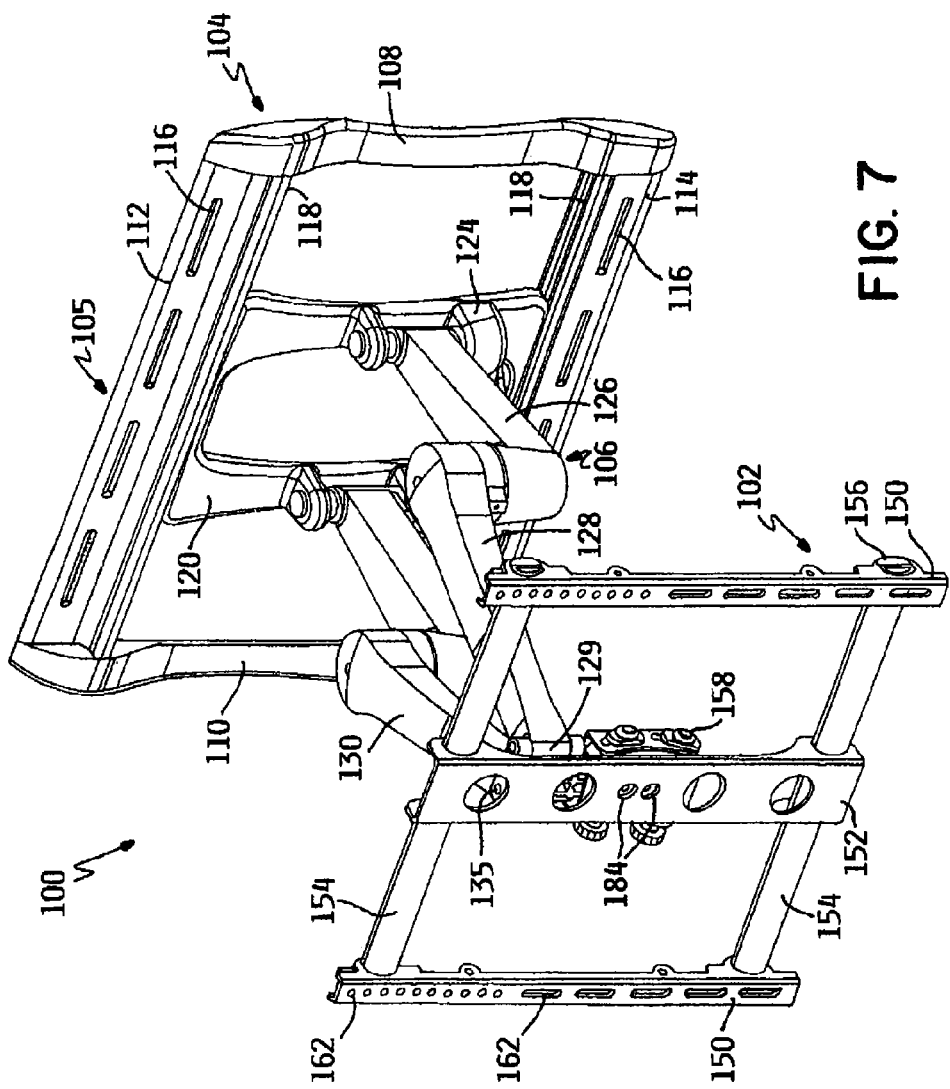
FIG. 7 is a front perspective view of a flat panel display mount according to an embodiment of the present invention.
Figure 8:
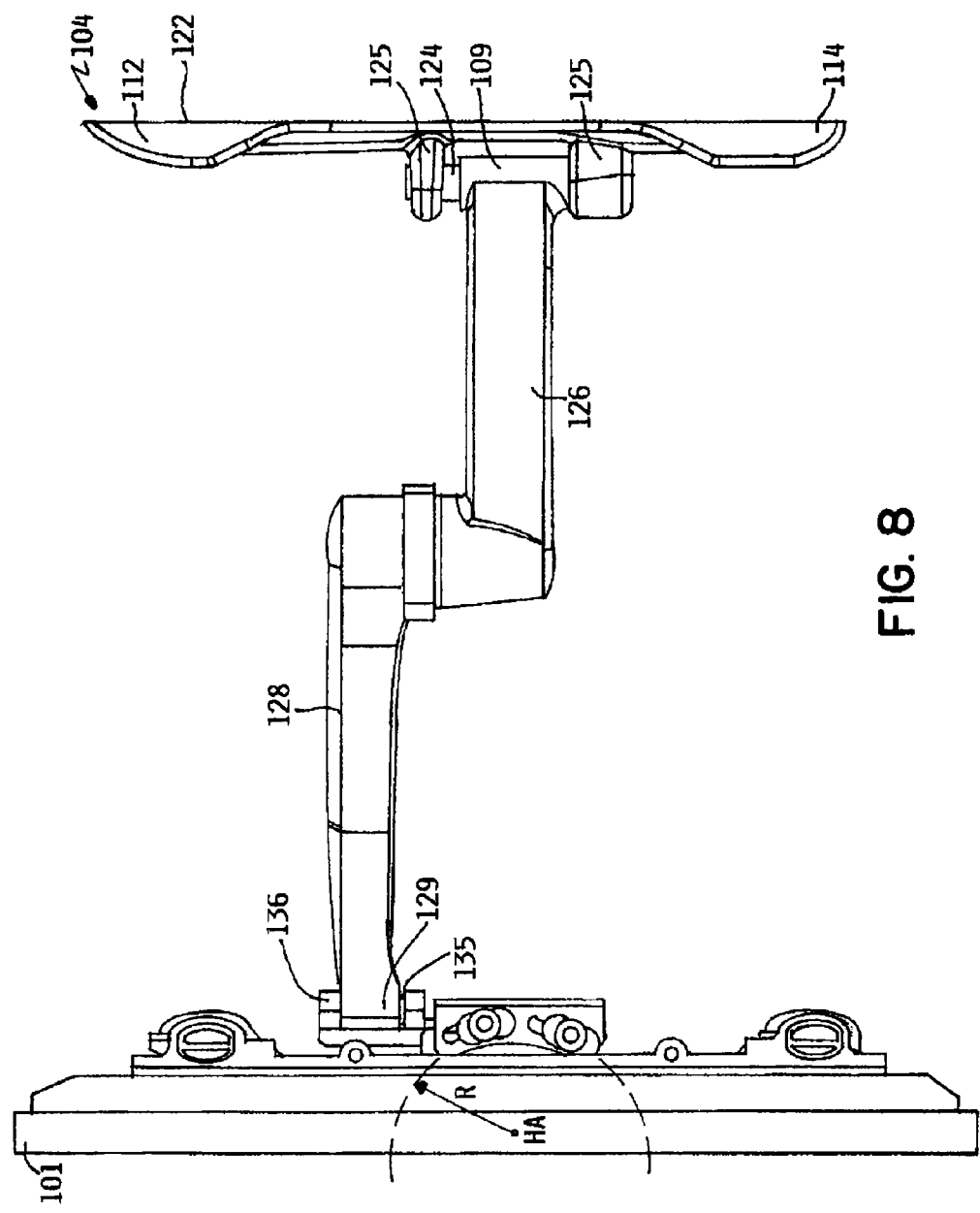
FIG. 8 is a side elevation view of the flat panel display mount of FIG. 7 and a flat panel display on the mount.
Figure 9:
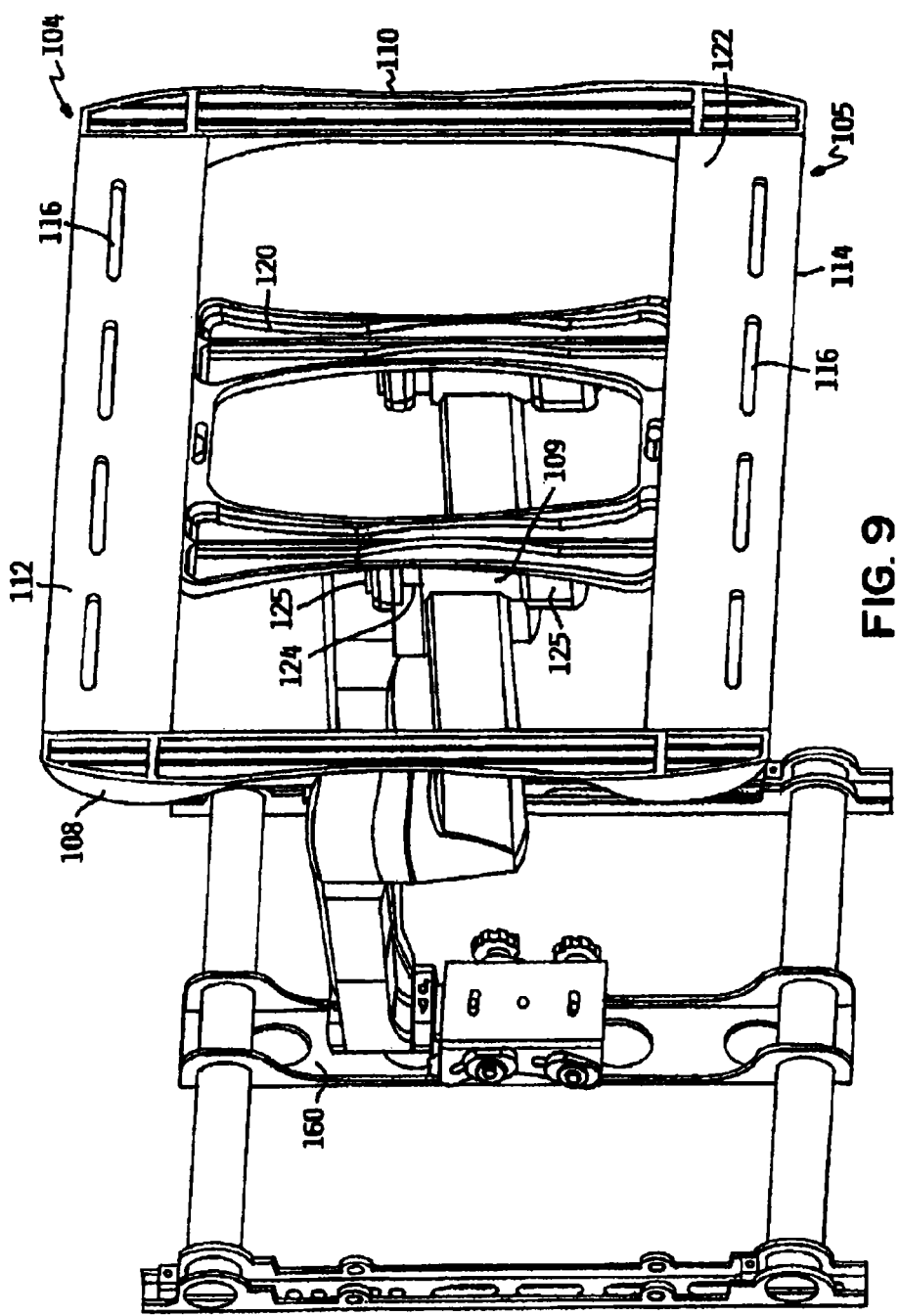
FIG. 9 is a rear perspective view of the flat panel display mount of FIG. 7.
Figure 10:
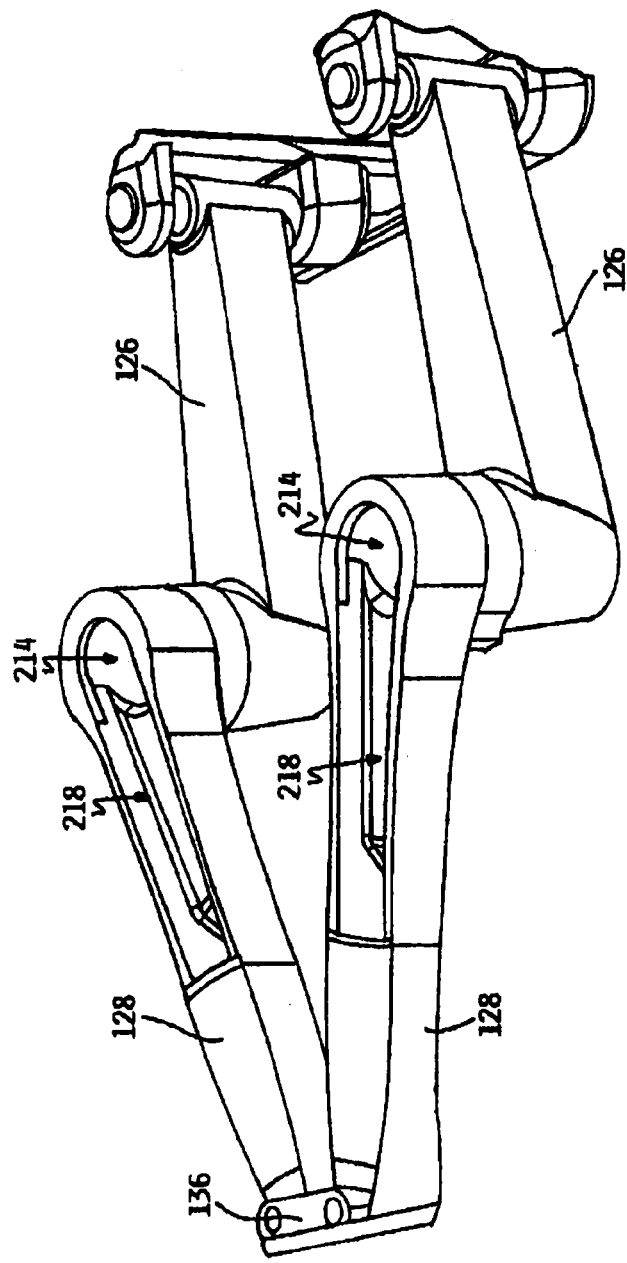
FIG. 10 is a fragmentary perspective view of the arm assembly portion of the flat panel display mount of FIG. 7.
Figure 11:
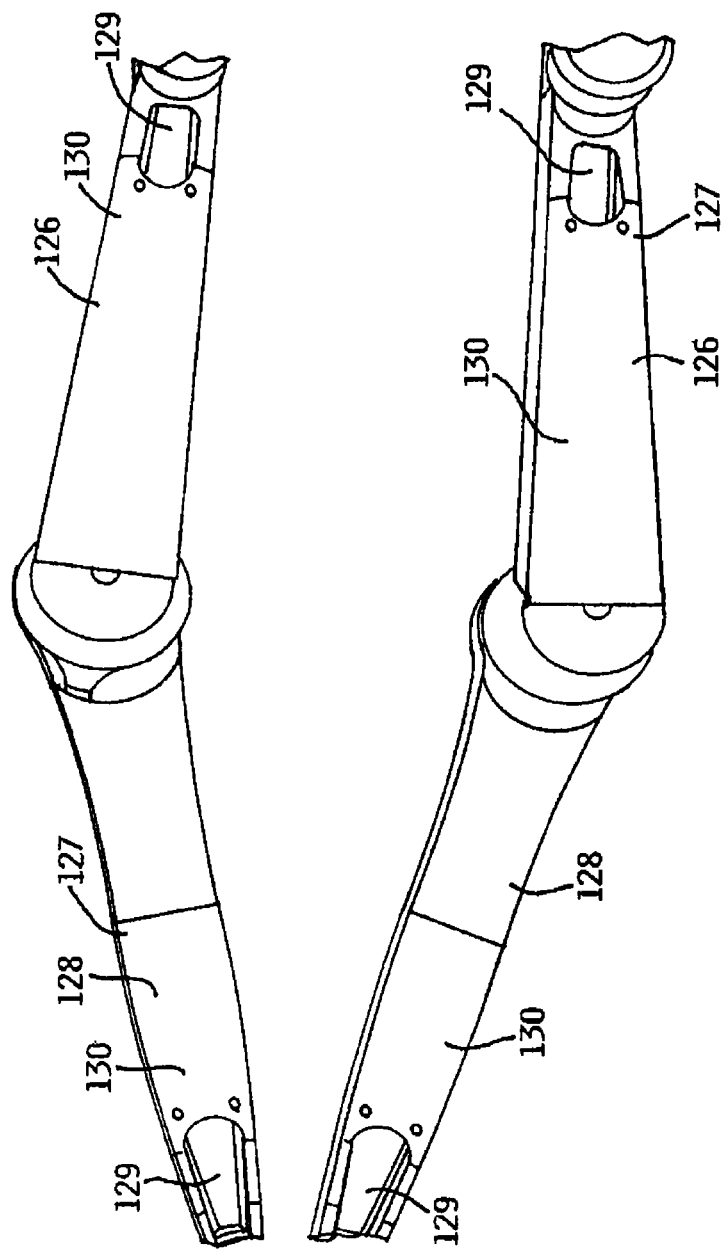
FIG. 11 is a bottom perspective view of the arm assembly of FIG. 10.
Figure 12:
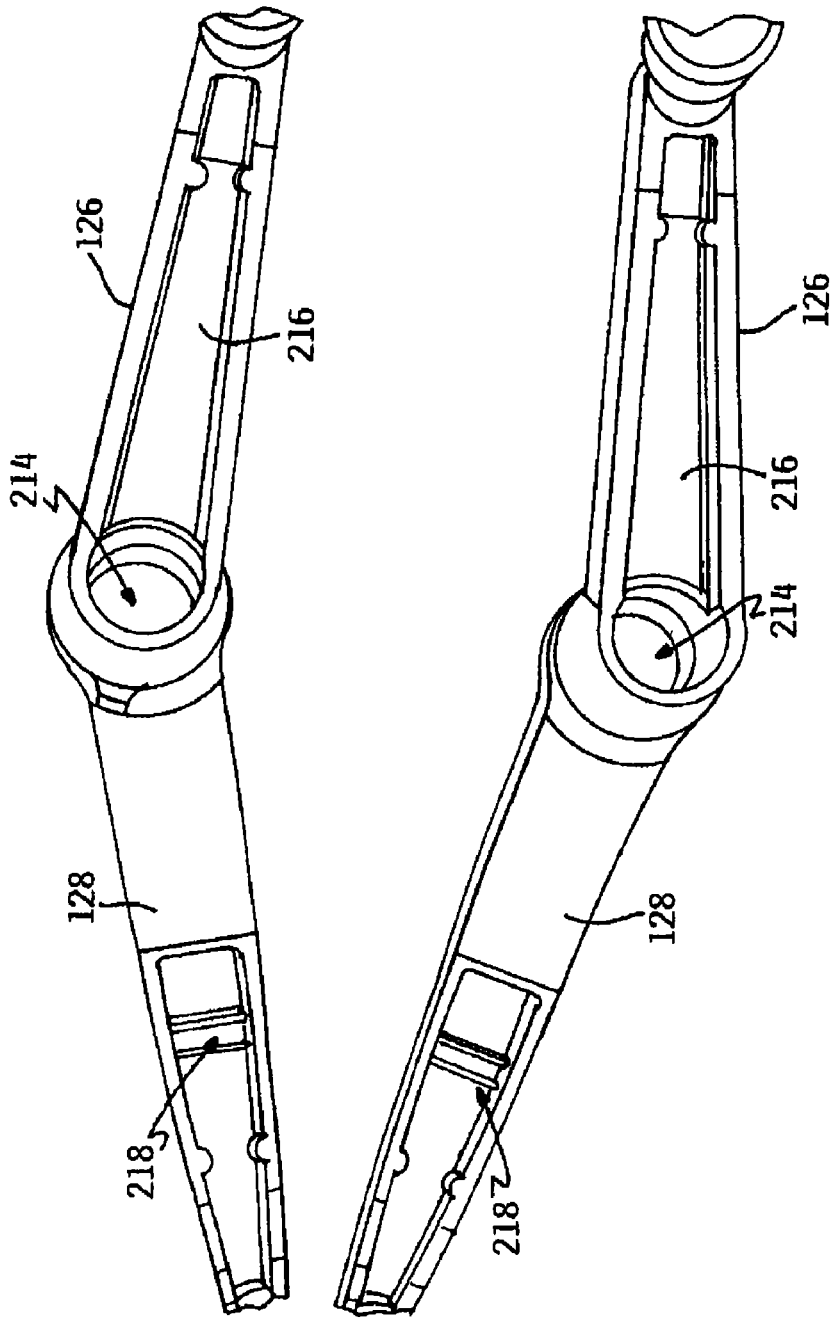
FIG. 12 is a bottom perspective view of the arm assembly of FIG. 10.
Figure 13:
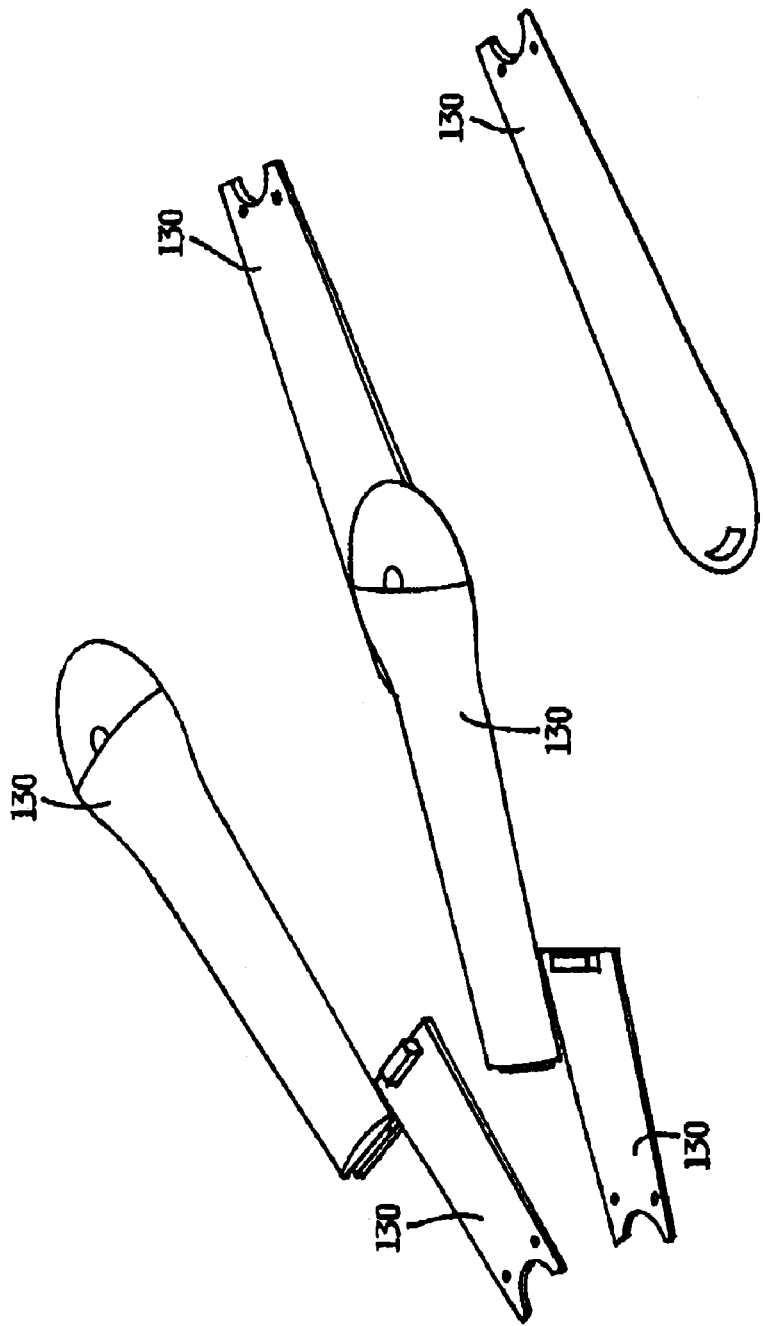
FIG. 13 is a perspective view of the arm cover portions of the arm assembly of FIG. 10.
Figure 14:
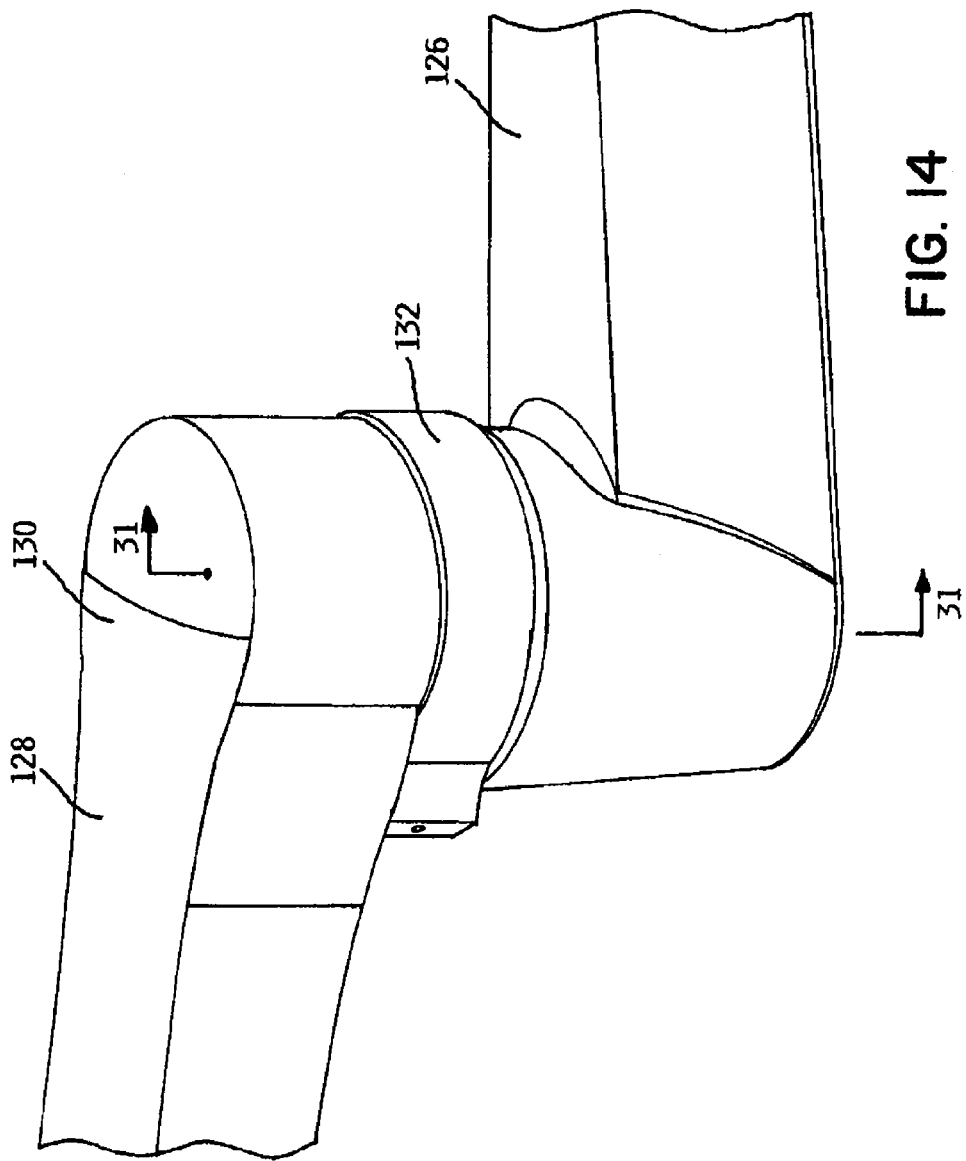
FIG. 14 is a fragmentary perspective view of the articulating arm joint portion of the flat panel display mount of FIG. 7.

As can be seen in FIGS. 7-9, mounting assembly 102 generally includes brace arms 154 coupling side brackets 150 and center bracket 152. Tilt head 158 is mounted on rear surface 160 of center bracket 152.

Figure 20:
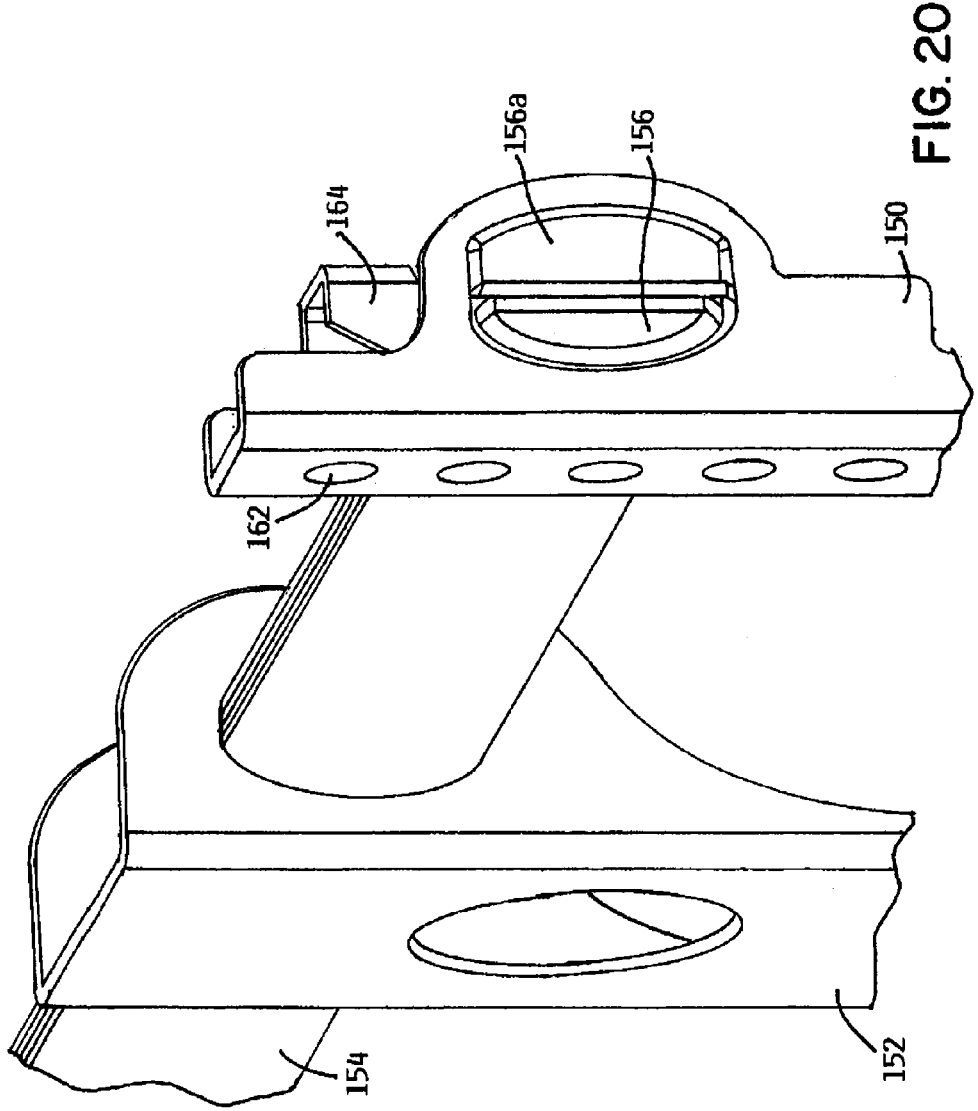
FIG. 20 is a fragmentary perspective view of a brace arm with side and center brackets of the flat panel display mount of FIG. 7.
Figure 21:
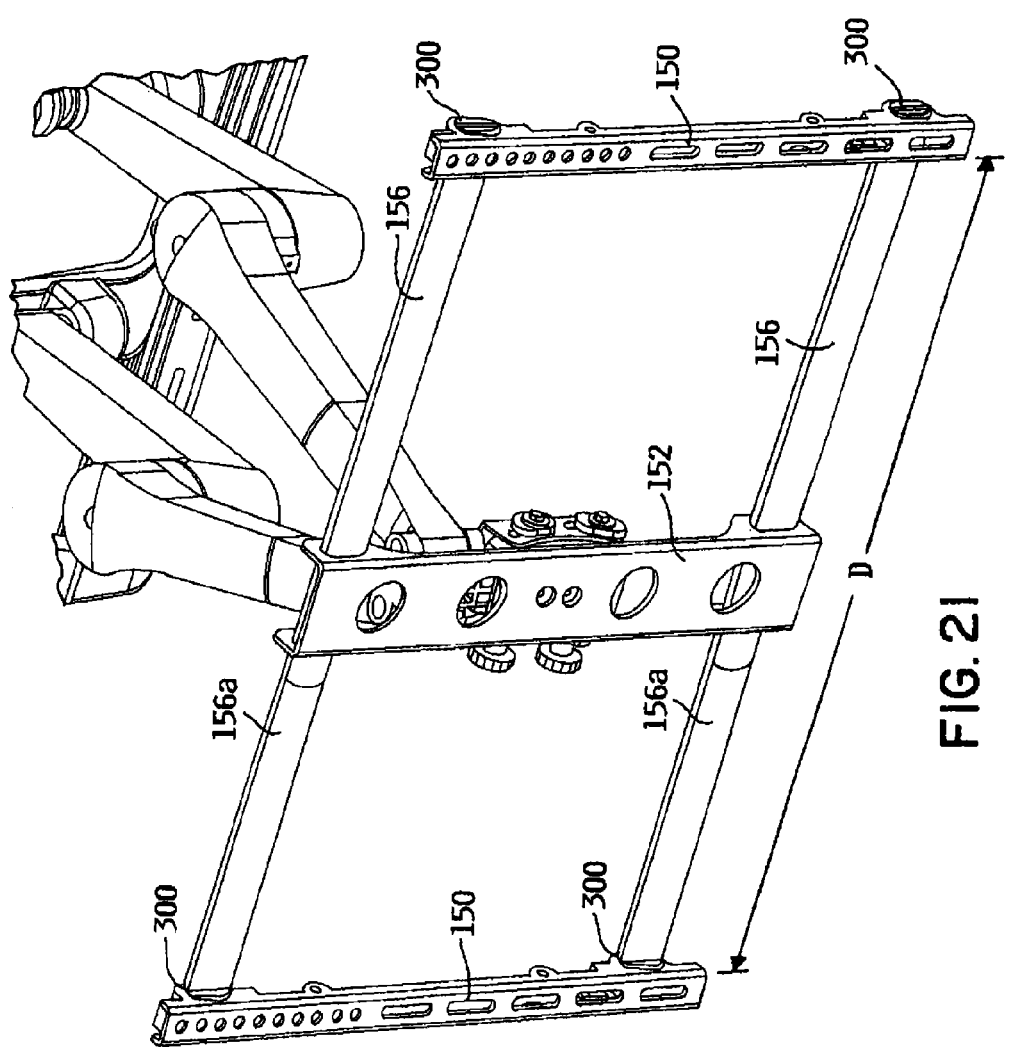
FIG. 21 is a perspective view of a mount according to an embodiment of the invention with the brace arms extended to accommodate a large flat panel display.
Figure 22:
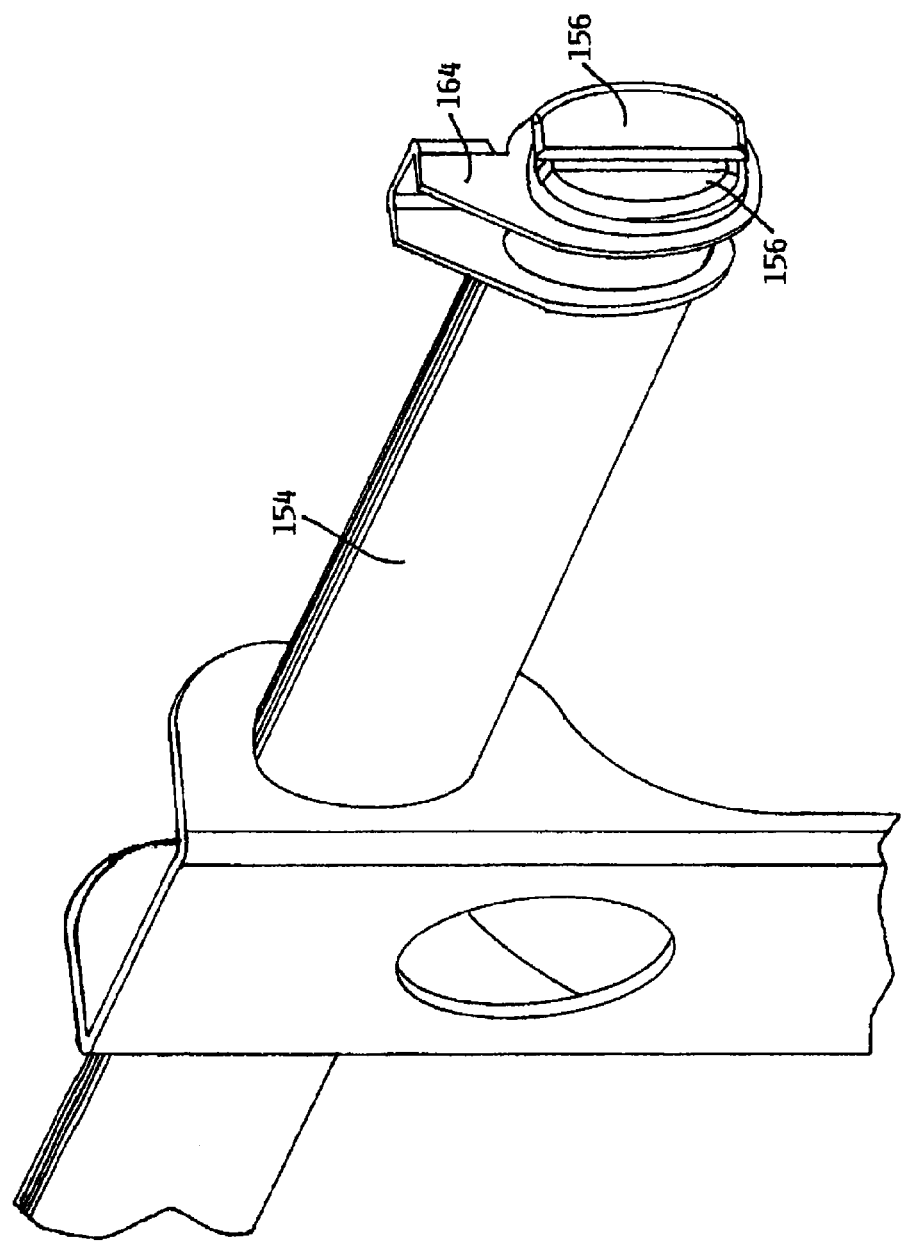
FIG. 22 is a fragmentary perspective view of the brace arm and center bracket of the mount depicted in FIG. 20 with the side bracket removed.
Figure 23:
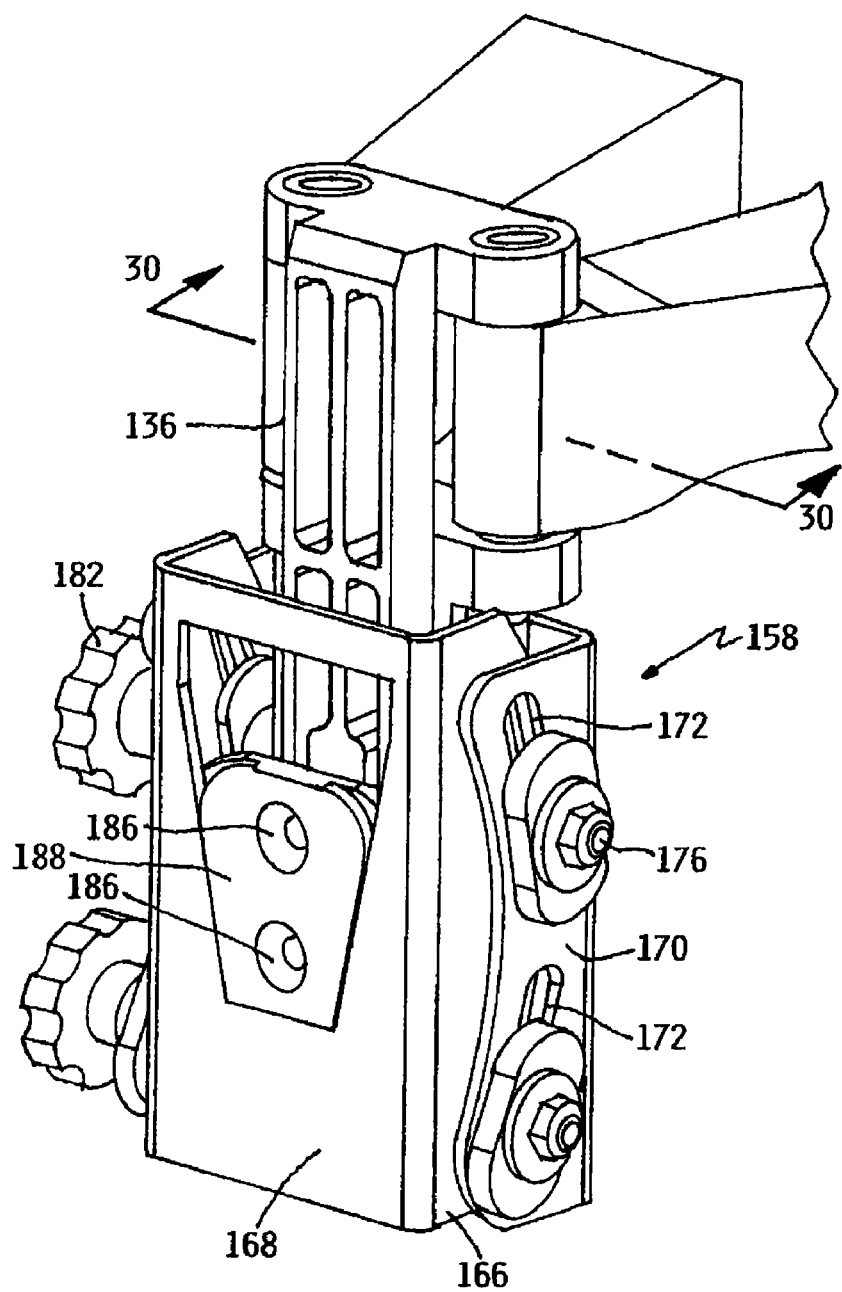
FIG. 23 is a fragmentary perspective view of the tilt head portion of the flat panel display mount of FIG. 7.
Figure 24:
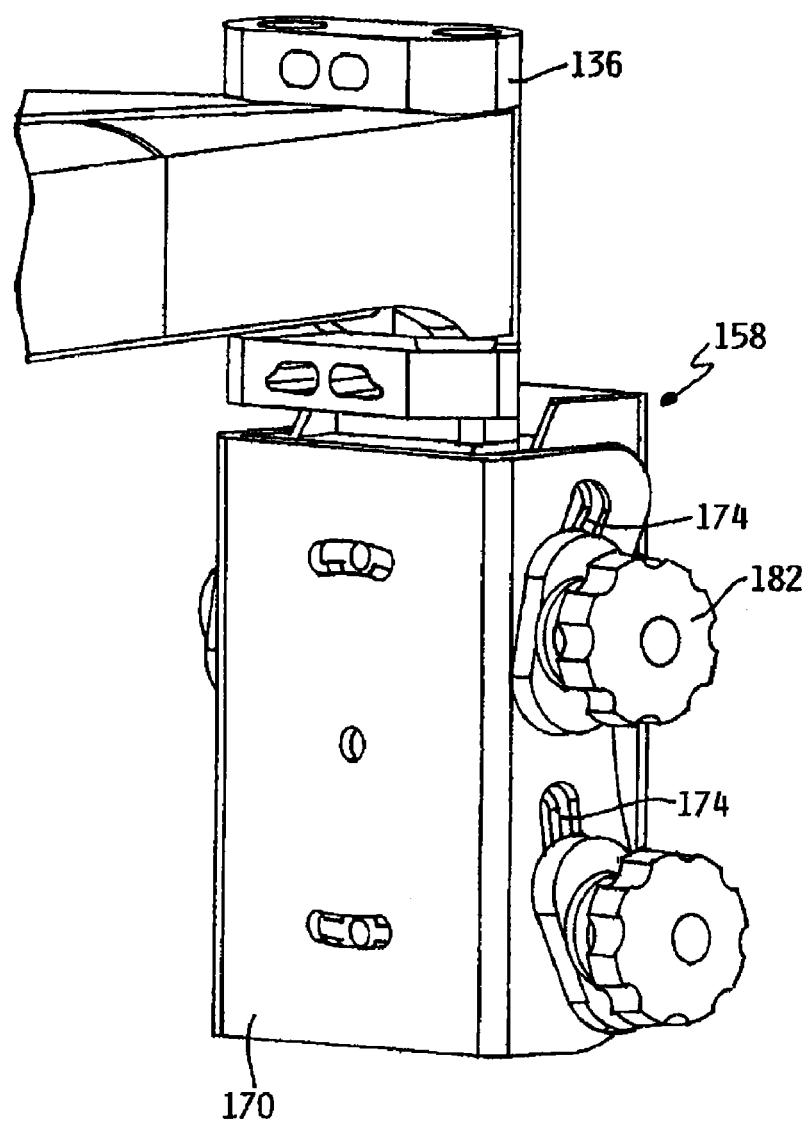
FIG. 24 is a fragmentary perspective view of the tilt head portion of the flat panel display mount of FIG. 7.
Figure 25:
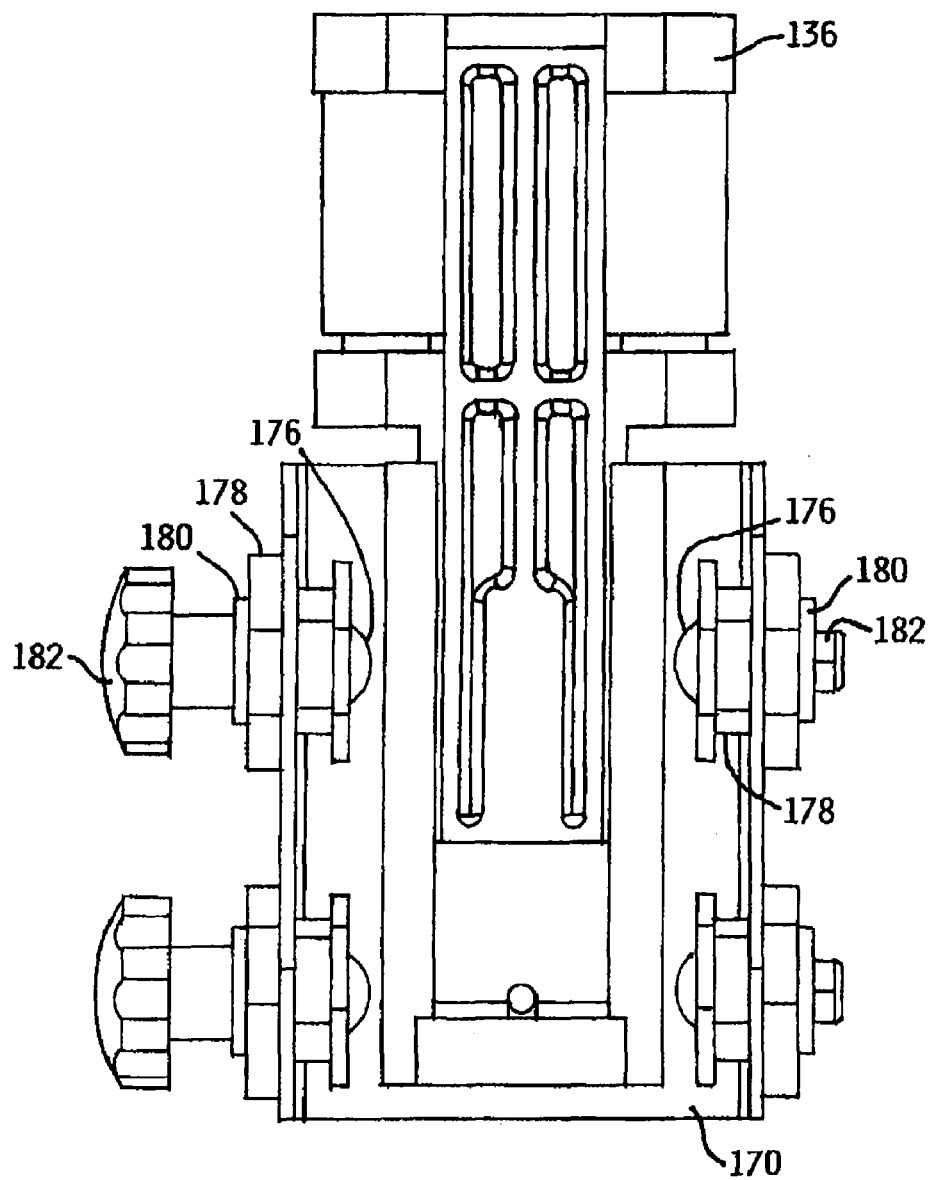
FIG. 25 is a fragmentary elevation view of the tilt head portion of the flat panel display mount of FIG. 7.
Figure 26:
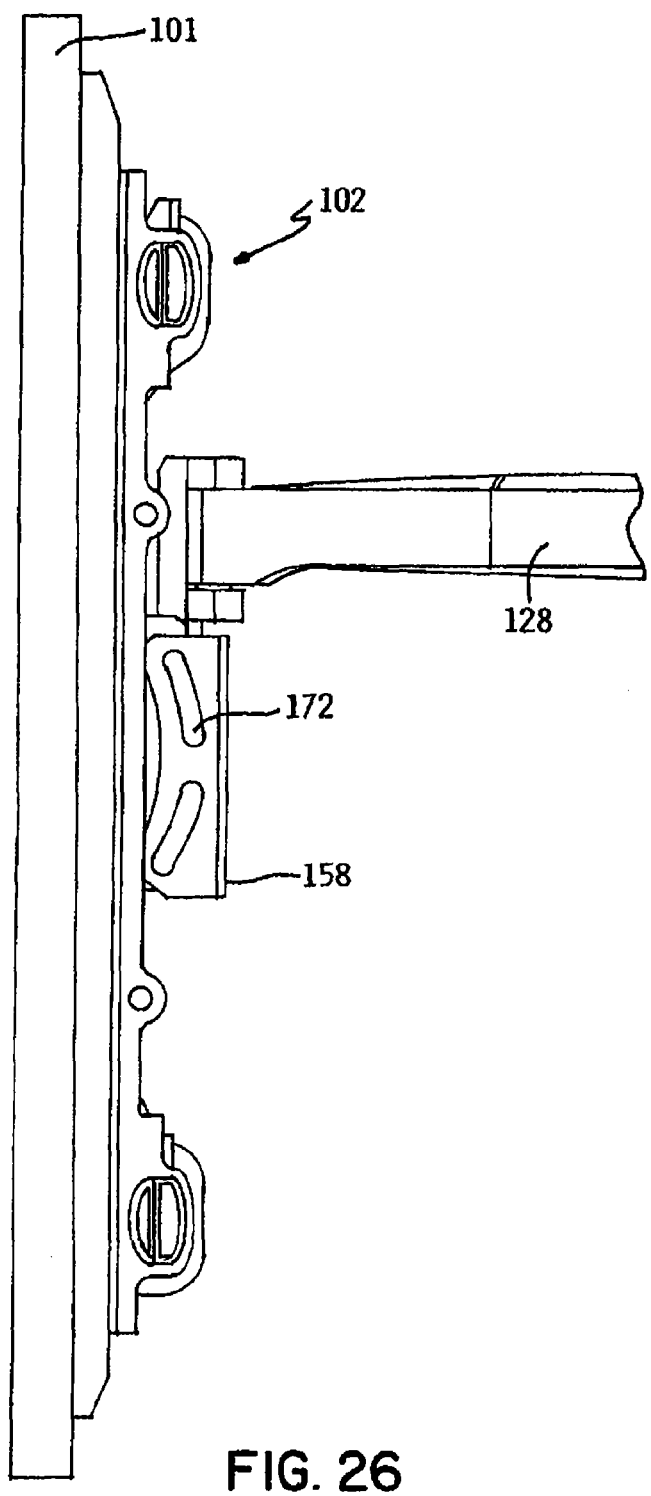
FIG. 26 is a fragmentary side elevation view of the flat panel display mount of FIG. 7 with a flat panel display mounted thereon.

Side brackets 150 each define a plurality of slots 162 for mounting a display on mount assembly 102. As depicted in FIG. 20 and FIG. 21, each of brace arms 154 generally includes a pair of generally D-shaped tubes 156, 156a, that are slidably disposed against each other. Tubes 156, 156a, are held within side brackets 150 by bracket 164. As depicted in FIG. 21, sliding tubes 156, 156a, relative to each other enables the distance D between side brackets 150 to be adjusted to fit the mounting apertures of variously sized flat panel displays. Bracket 164 can be made from a resilient material so that, as tubes 156, 156a, are slid away from each other, bracket 164 tightens around the tube remaining in the upper and lower portion of each side bracket 150, retaining it therein. The overall length of tubes 156, 156a, between side brackets 150 can be adjusted so that no part of either the upper or lower brace arms 154 extends beyond the width of the display, creating a more aesthetically pleasing appearance. In addition, each of side brackets 150 may be positioned anywhere along the length of brace arms 154 between center bracket 152 and brace arm ends 300, thereby providing even more mounting flexibility.

Figure 45:
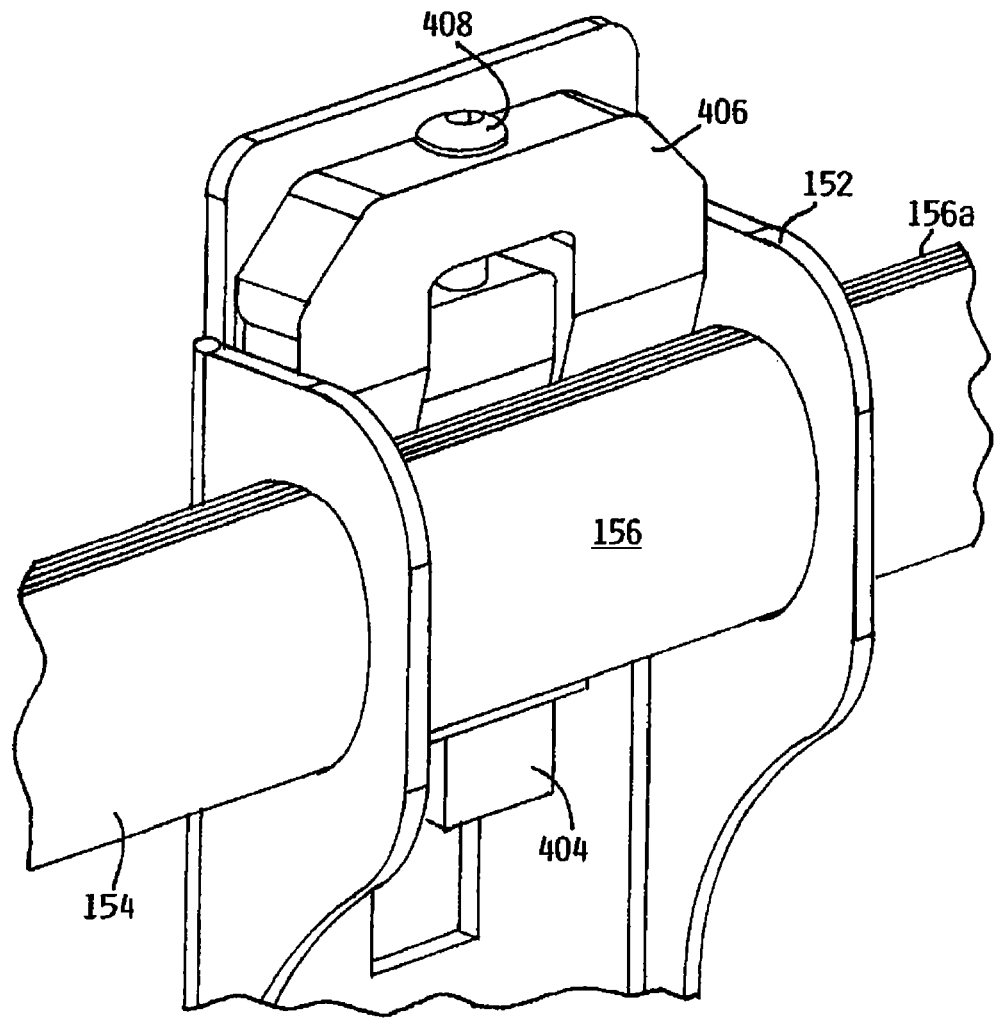
FIG. 45 is a fragmentary perspective view of a brace arm and center bracket of the mount of FIG. 33.
Figure 46:
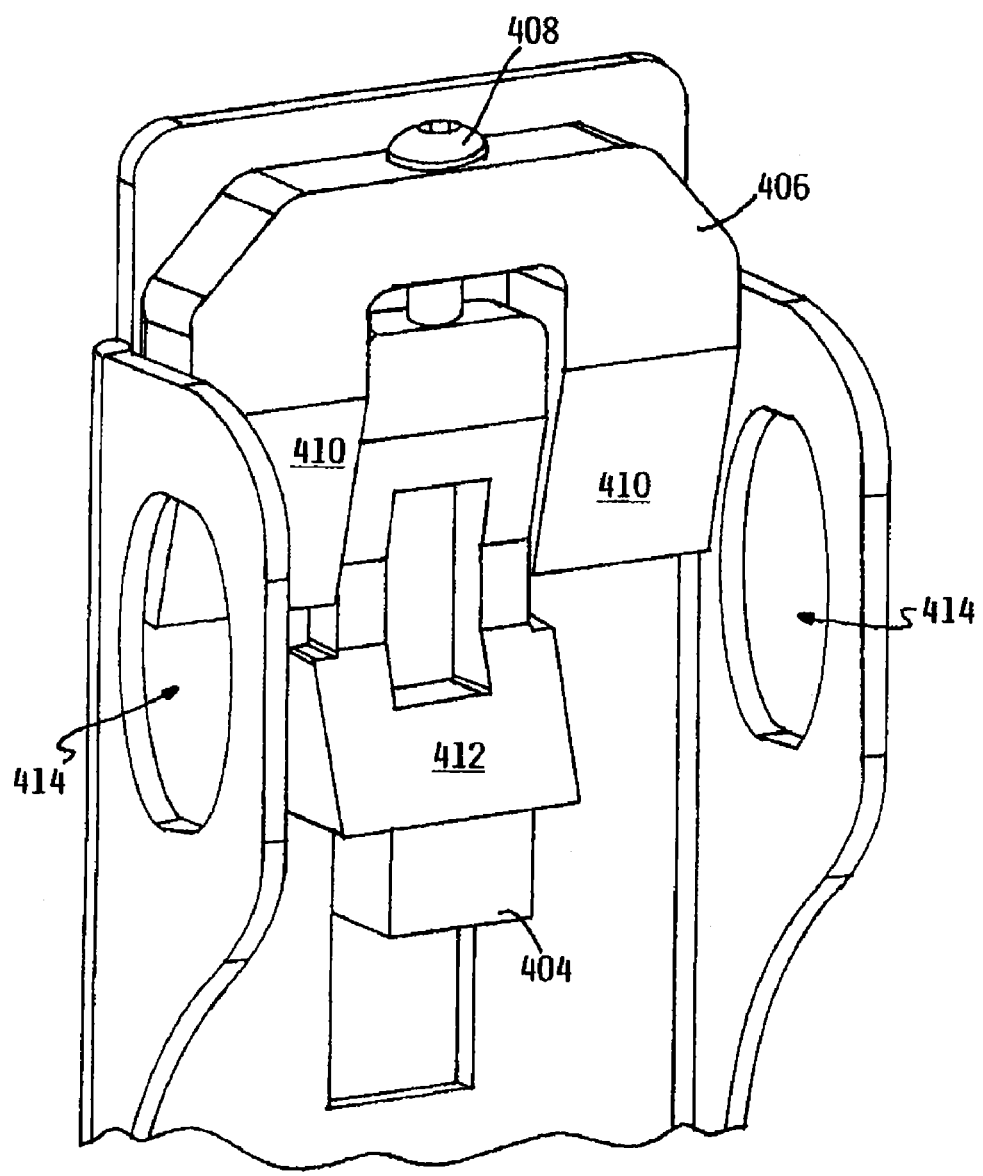
FIG. 46 is a fragmentary perspective view of the center bracket of the mount of FIG. 33 with brace arm removed.

In an alternative embodiment depicted in FIGS. 43-46, the facing surface 156c of each of generally D-shaped tubes 156, 156a, has a projecting ridge 156d and an adjacent recess 156e. The ridge 156d of tube 156 engages and is slidable in recess 156e of tube 156a, and the ridge 156d of tube 156a engages and is slidable in recess 156e of tube 156 such that tubes 156, 156a, are resistant to vertical displacement relative to each other. In this embodiment, tube 156 has cap 400 which is riveted to side bracket 150 with rivets 402. Wedge block 404 is fixed to center bracket 152, while wedge block 406 is vertically translatable relative to center bracket 152. Adjusting screw 408 extends through wedge block 406 and threads into wedge block 404. Wedge block 406 presents sloped surfaces 410, while wedge block 404 presents opposingly sloped surface 412. In use, tubes 156, 156a, extend through oval apertures 414 in center bracket 152 as depicted in FIG. 45. sloped surfaces 410, 412, of wedge blocks 406, 404, respectively confront the outer surface of tube 156a. To adjust the length of brace arm 154, adjusting screw 408 is loosened to enable wedge block 406 to move vertically. Tubes 156, 156a, can be slid relative to each other to shorten or lengthen brace arm 154 in this configuration. When the desired length of brace arm 154 is set, adjusting screw 408 is then tightened to draw wedge block 406 toward wedge block 404. Sloped surfaces 410, 412, urge tubes 156, 156a, outward with ever increasing pressure as adjusting screw 408 is tightened, pressing tube 156 against the edge of apertures 414. Tubes 156, 156a, are thereby frictionally fixed within apertures 414, thereby inhibiting or preventing tubes 156, 156a, from sliding relative to each other.

FIGS. 23-26 depict an embodiment of a tilt adjustable display interface head. Tilt head 158 enables flat panel display 101 and mount assembly 102 to be tilted upward or downward about a horizontal axis relative to arm assemblies 106 and wall interface assembly 104. Tilt head 158 generally includes a first casing 166 presenting a front surface 168 that can be affixed to the center bracket 152 of mount assembly 102 by inserting fasteners through apertures 184 in center bracket 152 and through apertures 186 in connector 188. Second casing 170 is affixed to first casing 166 with screw 176 extending through complementary slots 172, 174, and secured with washer 180 and nut 182. Guide members 178 ride in slots 172, 174, and have geometry conforming to slots 172, 174, so as to enable sliding translation of guide members 178 in slots 172, 174. Screw 176 has finger-grippable knob 182 on one end. When screw 176 is loosened by turning knob 182, guide members 178 can translate in slots 172, 174, thereby enabling casing 168 to tilt about a horizontal axis HA spaced apart from the mount as depicted in FIG. 8. As also depicted in FIG. 8, horizontal axis HA is located at the center of a circle of radius R, wherein slots 172, 174, are positioned along the arc of the circle. It is advantageous if slots 172, 174, are positioned and configured so that horizontal axis HA passes through the flat panel display 101 attached to the mount. Once display 101 is in the desired tilt position, knob 182 can be rotated to tighten screw 176 thereby applying increasing friction to inhibit or prevent translation of guide members 178 in slots 172, 174, fixing display 101 in the desired tilt position.

In embodiments of the invention, slots 172, 174, can have a generally constant radius of curvature with a center coincident with a substantially horizontal axis. Translation of guide members 178 through slots 172, 174 enables tilting of flat panel display 101 about horizontal axis HA. Tilt head 158 and panel mount 102 can be positioned such that the horizontal axis extends through or proximate the center of gravity of the mount assembly and a flat panel display 101 mounted thereon. Therefore, as flat panel display 101 is tilted through the path of travel defined by slots 172, 174, the center of gravity remains substantially stationary. Such systems are disclosed in U.S. Pat. Nos. 6,905,101 and 7,152,836, which are hereby incorporated by reference in their entirety.

Because the horizontal axis substantially coincides with the center of gravity, flat panel display 101 and mount assembly 102 are substantially vertically balanced. As a result, substantially the same effort is required to tilt flat panel display 101 in the upward direction as in the downward direction. This makes the display mount 100 self-balanced and easy to rotate, but still may be positioned at a plurality of locations without the need for additional locking structure. This is advantageous for use with large flat panel displays, which can be heavy and difficult to maneuver.

Figure 27:
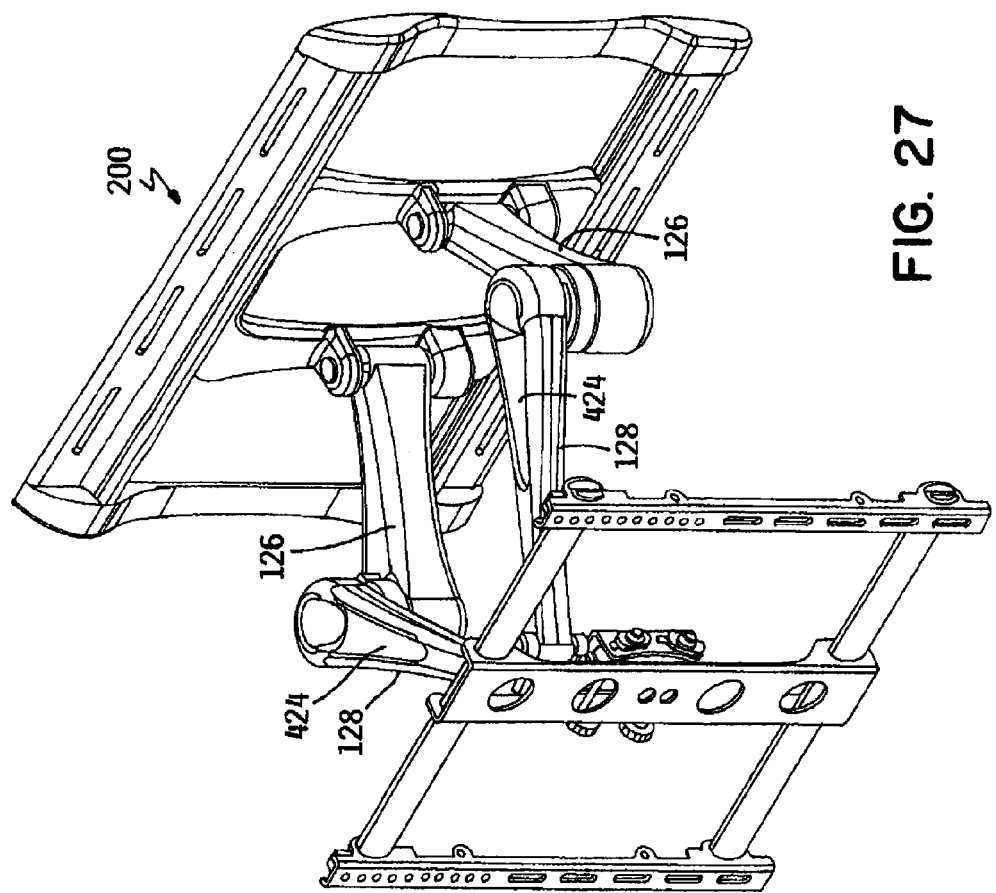
FIG. 27 is a front perspective view of a flat panel display mount according to an alternative embodiment of the present invention.
Figure 28:
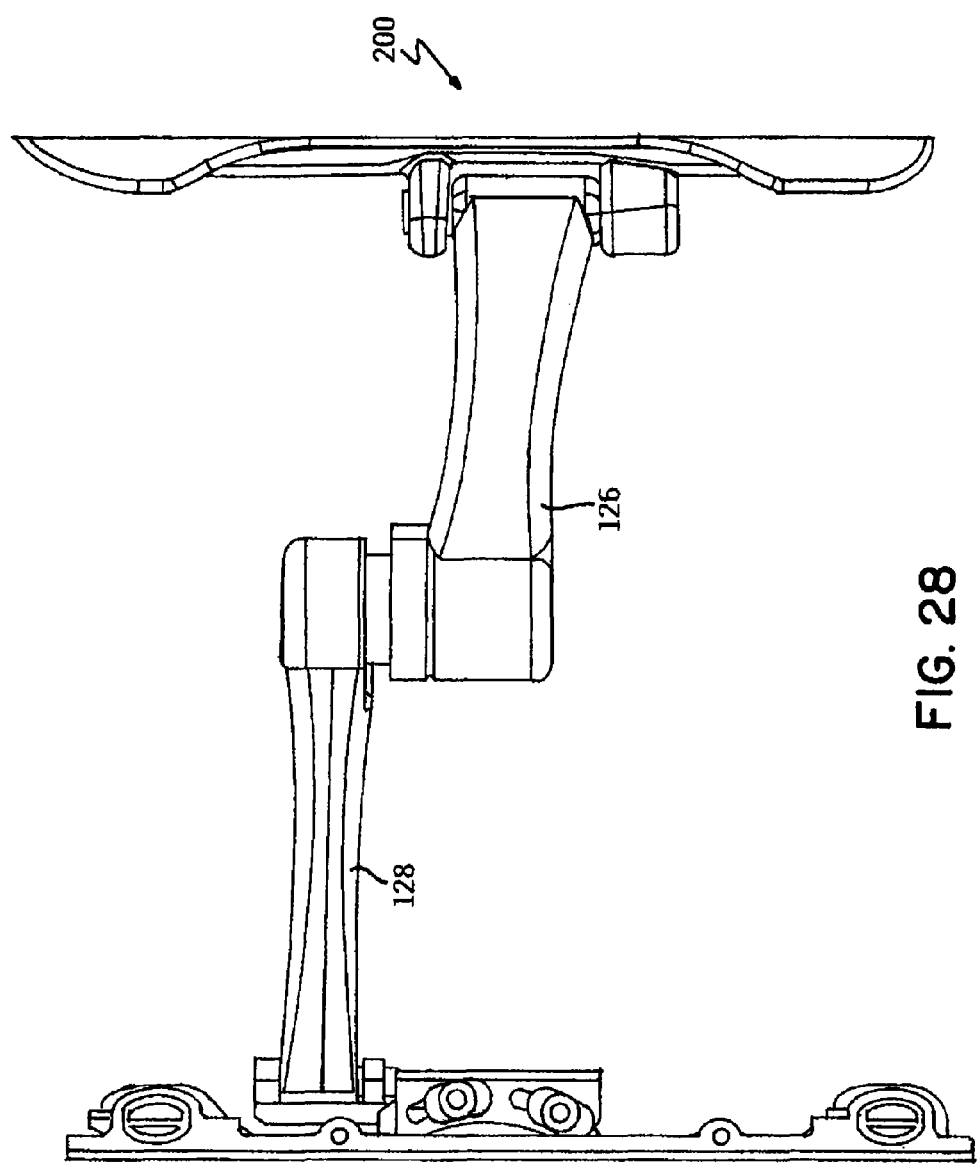
FIG. 28 is a side elevation view of the flat panel display mount of FIG. 27.
Figure 29:
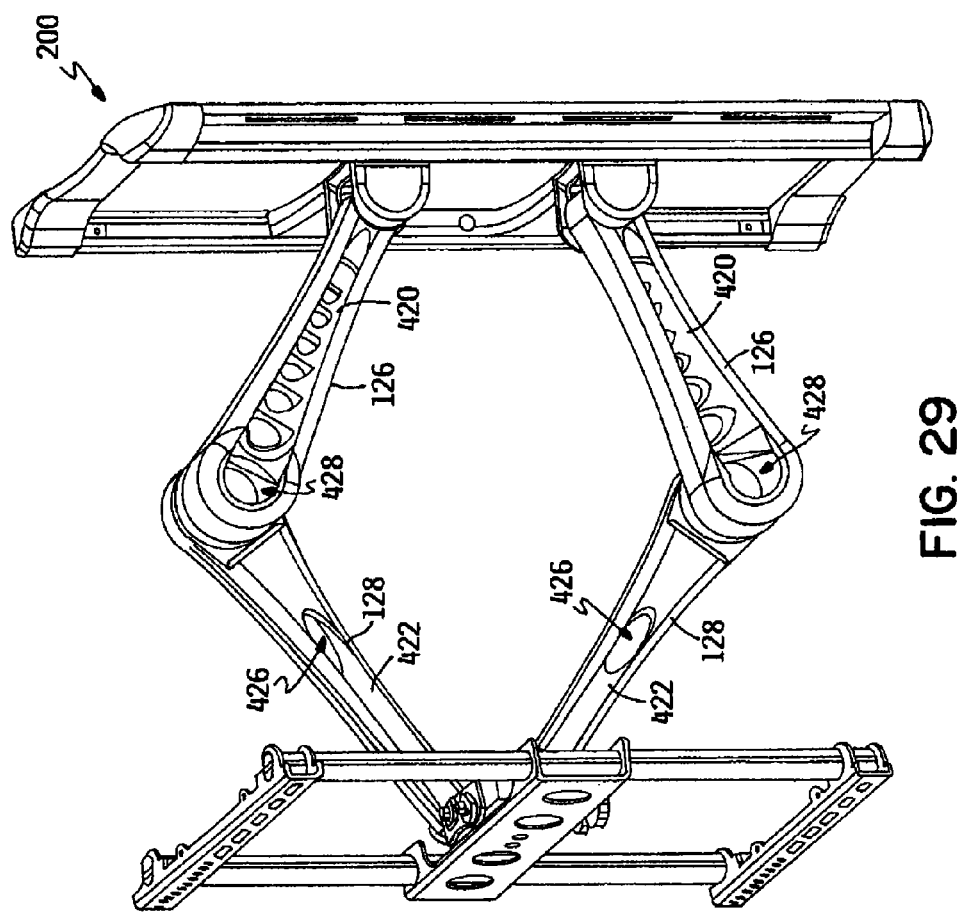
FIG. 29 is a bottom perspective view of the flat panel display mount of FIG. 27.

FIGS. 27-29 depict another embodiment of a display mount 200 according to the present invention. In this embodiment, each of arms 126 define a downwardly facing wire receiving cavity 420 while each of arms 128 define a downwardly facing wire receiving cavity 422. Arms 128 also define an upwardly facing wire cavity 424 proximate the connection with arm 126. Wire cavity 424 is connected with wire cavity 422 by aperture 426. Again, a wire passage 428 is provided through the pivot joint coupling arms 126, 128. In use, wires or cables can be routed from an outlet on a wall, through cavity 420 and upward through wire passage 428. The wires or cables can then be passed through aperture 426 and into cavity 422 for connection to a display attached to the mount 200. In this embodiment, the wires and cables are thus concealed from top view except where they pass through wire passage 428 and rest in cavity 424.

The embodiments above are intended to be illustrative and not limiting. Additional embodiments are encompassed within the scope of the claims. Although the present invention has been described with reference to particular embodiments, those skilled in the art will recognize that changes may be made in form and detail without departing from the spirit and scope of the invention. For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A mount for an electronic display device comprising:
   a wall interface portion adapted to attach to the wall of a structure;
   a display interface portion adapted to operably couple to the electronic display device; and
   at least one arm assembly comprising a pair of arms, each arm presenting a pair of opposing ends, the arms pivotally coupled together at a joint at one of the opposing ends of each arm, the opposite end of each arm pivotally coupled to one of the wall interface portion or the display interface portion, each arm defining a longitudinally oriented cavity for receiving wires therein, the arms together defining an aperture through the joint so as to connect the longitudinally oriented cavities of each arm such that the cavities and the aperture define a continuous wire passage extending substantially the length of the coupled arms for concealing wires therein from outside view.

2. The mount of claim 1, wherein the joint comprises a pair of couplers, each coupler attached to a separate one of the at least one pair of arms, one of the couplers having an outwardly extending radial flange and the other of the couplers having an inwardly extending radial flange, the flanges overlapping and interlocked with each other to pivotally couple the arms together.

3. The mount of claim 1, wherein at least one of the arms defines an opening on a top side of the arm extending from the exterior of the arm into the longitudinally oriented cavity of the arm, and further comprising a removable cover for selectively closing the opening.

4. The mount of claim 1, wherein the wall interface portion comprises an arm mount pivotally coupled to the at least one arm assembly, the arm mount selectively laterally positionable on the wall interface portion.

5. The mount of claim 1, wherein the display interface portion comprises a tilt assembly enabling selective tilting of an electronic display coupled with the display interface portion about a substantially horizontal axis.

6. The mount of claim 1, wherein the display interface portion comprises a center bracket, a pair of side brackets laterally spaced apart from the center bracket, and a pair of vertically spaced apart brace arms coupling the center bracket and the pair of side brackets, each of the brace arms comprising a pair of members selectively slidably engaged with each other so as to enable the side brackets to be separately laterally positioned relative to the center bracket.

7. The mount of claim 6, wherein the members of the brace arms comprise elongate members having a generally D-shaped cross-section.

8. An electronic display system comprising:
an electronic display device; and
a mount for attaching the electronic display device to the wall of a structure, the mount including a wall interface portion adapted to attach to the wall, a display interface portion operably coupled to the electronic display device, and at least one pair of articulating arms operably coupling the wall interface portion and the display interface portion, the display interface portion comprising a center bracket, a pair of side brackets laterally spaced apart from the center bracket, and a pair of vertically spaced apart brace arms coupling the center bracket and the pair of side brackets, each of the brace arms comprising a pair of members selectively slidably engaged with each other so as to enable the side brackets to be separately laterally positioned relative to the center bracket.

9. The electronic display system of claim 8, wherein the members of the brace arms comprise elongate members having a generally D-shaped cross-section.

10. The electronic display system of claim 8, wherein each arm of the at least one pair of articulating arms presents a pair of opposing ends, the arms pivotally coupled together at a joint at one of the opposing ends of each arm, the opposite end of each arm pivotally coupled to one of the wall interface portion or the display interface portion, each arm defining a longitudinally oriented cavity for receiving wires therein, the arms together defining an aperture through the joint so as to connect the longitudinally oriented cavities of each arm such that the cavities and the aperture define a continuous wire passage extending substantially the length of the coupled arms for concealing wires therein from outside view.

11. The electronic display system of claim 10, wherein the joint comprises a pair of couplers, each coupler attached to a separate one of the at least one pair of arms, one of the couplers having an outwardly extending radial flange and the other of the couplers having an inwardly extending radial flange, the flanges overlapping and interlocked with each other to pivotally couple the arms together.

12. The electronic display system of claim 10, wherein at least one of the arms defines an opening on a top side of the arm extending from the exterior of the arm into the longitudinally oriented cavity of the arm, and further comprising a removable cover for selectively closing the opening.

13. The electronic display system of claim 10, wherein the wall interface portion comprises an arm mount pivotally coupled to the at least one pair of articulating arms, the arm mount selectively laterally positionable on the wall interface portion.

14. The electronic display system of claim 10, wherein the display interface portion comprises a tilt assembly enabling selective tilting of an electronic display coupled with the display interface portion about a substantially horizontal axis.

15. An electronic display system comprising:
an electronic display device;
a wall interface portion adapted to attach to the wall of a structure;
a display interface portion operably coupled to the electronic display device; and
at least one arm assembly comprising a pair of arms, each arm presenting a pair of opposing ends, the arms pivotally coupled together at a joint at one of the opposing ends of each arm, the opposite end of each arm pivotally coupled to one of the wall interface portion or the display interface portion, each arm defining a longitudinally oriented cavity for receiving wires therein, the arms together defining an aperture through the joint so as to connect the longitudinally oriented cavities of each arm such that the cavities and the aperture define a continuous wire passage extending substantially the length of the coupled arms for concealing wires therein from outside view.

16. The electronic display system of claim 15, wherein the joint comprises a pair of couplers, each coupler attached to a separate one of the at least one pair of arms, one of the couplers having an outwardly extending radial flange and the other of the couplers having an inwardly extending radial flange, the flanges overlapping and interlocked with each other to pivotally couple the arms together.

17. The electronic display system of claim 15, wherein at least one of the arms defines an opening on a top side of the arm extending from the exterior of the arm into the longitudinally oriented cavity of the arm, and further comprising a removable cover for selectively closing the opening.

18. The electronic display system of claim 15, wherein the wall interface portion comprises an arm mount pivotally coupled to the at least one arm assembly, the arm mount selectively laterally positionable on the wall interface portion.

19. The electronic display system of claim 15, wherein the display interface portion comprises a tilt assembly enabling selective tilting of the electronic display device about a substantially horizontal axis.

20. The electronic display system of claim 15, wherein the display interface portion comprises a center bracket, a pair of side brackets laterally spaced apart from the center bracket, and a pair of vertically spaced apart brace arms coupling the center bracket and the pair of side brackets, each of the brace arms comprising a pair of members selectively slidably engaged with each other so as to enable the side brackets to be separately laterally positioned relative to the center bracket.

21. The electronic display system of claim 20, wherein the members of the brace arms comprise elongate members having a generally D-shaped cross-section.

* * * * *